US012586517B2

(12) United States Patent
Yang et al.

(10) Patent No.: US 12,586,517 B2
(45) Date of Patent: Mar. 24, 2026

(54) IMAGE DISPLAY APPARATUS, AND VIDEO WALL INCLUDING THE SAME

(71) Applicant: LG ELECTRONICS INC., Seoul (KR)

(72) Inventors: Sunghyun Yang, Seoul (KR); Daejoong Kim, Seoul (KR); Jaewoon Lee, Seoul (KR); Jaehoon Jeong, Seoul (KR); Heeyoung Lee, Seoul (KR); Dongsu Kim, Seoul (KR); Chansic Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/766,087

(22) Filed: Jul. 8, 2024

(65) Prior Publication Data

US 2025/0140167 A1 May 1, 2025

(30) Foreign Application Priority Data

Oct. 25, 2023 (KR) ........................ 10-2023-0143507

(51) Int. Cl.
*G09G 3/32* (2016.01)

(52) U.S. Cl.
CPC ......... *G09G 3/32* (2013.01); *G09G 2300/026* (2013.01); *G09G 2310/0267* (2013.01);
(Continued)

(58) Field of Classification Search
CPC ..... G09G 2300/026; G09G 2310/0267; G09G 2310/0275; G09G 2310/0291;
(Continued)

(56) References Cited

U.S. PATENT DOCUMENTS

2007/0120118 A1* 5/2007 Kubota ............. G02F 1/134336 257/40
2008/0231560 A1* 9/2008 Yamashita ........... G09G 3/3266 345/76

(Continued)

FOREIGN PATENT DOCUMENTS

KR 10-2005-0122700 12/2005
KR 10-2008-0066434 7/2008

(Continued)

OTHER PUBLICATIONS

European Patent Office Application Serial No. 24187676.2, Search Report dated Dec. 9, 2024, 12 pages.

(Continued)

*Primary Examiner* — Roberto W Flores
(74) *Attorney, Agent, or Firm* — LEE, HONG, DEGERMAN, KANG & WAIMEY

(57) ABSTRACT

The image display apparatus and a video wall including the same according to an embodiment of the present disclosure includes: a panel including a plurality of light emitting diodes; a scan driver to output a scan signal; a data driver to output a data signal; and a controller to control the data driver, and the data driver includes a plurality of data driving integrated circuits, and the data driving integrated circuit includes a current source, a switch disposed between the current source and the light emitting diode, and a coupling compensator to output a compensation signal for compensating coupling noise caused based on turn-on or turn-off of the switch. Accordingly, luminance uniformity between the plurality of light emitting diodes may be maintained.

12 Claims, 23 Drawing Sheets

1200

(52) U.S. Cl.
CPC ............... *G09G 2310/0275* (2013.01); *G09G 2310/0291* (2013.01); *G09G 2320/0233* (2013.01)

(58) Field of Classification Search
CPC ... G09G 2320/0233; G09G 3/32–3291; G09G 2320/0209–0219
See application file for complete search history.

(56) References Cited

U.S. PATENT DOCUMENTS

| | | | | |
|---|---|---|---|---|
| 2014/0049182 | A1 | 2/2014 | Kawae et al. | |
| 2017/0139664 | A1* | 5/2017 | Park | H01R 24/60 |
| 2019/0327809 | A1 | 10/2019 | Watsuda | |
| 2020/0066204 | A1* | 2/2020 | Baumheinrich | G09G 3/32 |
| 2023/0298502 | A1* | 9/2023 | Lee | G09G 3/3233 |
| 2023/0343293 | A1* | 10/2023 | Gai | G09G 3/3233 |

FOREIGN PATENT DOCUMENTS

| | | |
|---|---|---|
| KR | 10-2020-0018215 | 2/2020 |
| KR | 10-2022-0037329 | 3/2022 |
| KR | 10-2023-0005695 | 1/2023 |

OTHER PUBLICATIONS

Korean Intellectual Property Office Application No. 10-2023-0143507, Notice of Allowance dated Dec. 23, 2024, 2 pages.

* cited by examiner

IMAGE DISPLAY APPARATUS, AND VIDEO WALL INCLUDING THE SAME

CROSS-REFERENCE TO RELATED APPLICATION(S)

Pursuant to 35 U.S.C. § 119(a), this application claims the benefit of earlier filing date and right of priority to Korean Patent Application No. 10-2023-0143507, filed on Oct. 25, 2023, the contents of which are all hereby incorporated by reference herein in their entireties.

BACKGROUND

1. Field

The present disclosure relates to an image display apparatus, and a video wall including the same, and more particularly, to an image display apparatus capable of stably sensing a pointer light without a separate optical sensor, and a video wall including the same.

2. Description of the Related Art

An image display apparatus is an apparatus with a display that displays images.

Various types of displays are used in the image display apparatus, including a liquid crystal display panel, a light emitting diode panel, etc.

For a light emitting diode panel-based image display apparatus, an active matrix driving scheme or a passive-matrix driving scheme is used in order to drive the light emitting diode panel.

When driving the light emitting diode panel-based image display apparatus based on the passive-matrix driving scheme, light emitting diodes are made to emit light or not by using a plurality of subframes.

Meanwhile, according to a gray level of an image signal, during a plurality of subframe periods, a corresponding data signal is applied, so the light emitting diode is emitted.

Meanwhile, there is a problem in that coupling noise is generated upon outputting a data signal using a data driving integrated circuit to drive the light emitting diode, so luminance upon emission becomes non-uniform between the light emitting diodes.

SUMMARY

It is an object of the present disclosure to provide an image display apparatus capable of maintaining luminance uniformity between a plurality of light emitting diodes, and a video wall including the same.

It is another object of the present disclosure to provide an image display apparatus capable of maintaining the luminance uniformity between the plurality of light emitting diodes even though there is a difference in number of light emitting diodes emitted by respective data driving integrated circuits, and a video wall including the same.

In accordance with an aspect of the present disclosure, the above and other objects can be accomplished by providing an image display apparatus which includes: a panel including a plurality of light emitting diodes; a scan driver configured to output a scan signal to the plurality of light emitting diodes; a data driver configured to output a data signal to the plurality of light emitting diodes; and a controller configured to control the data driver, in which the data driver includes a plurality of data driving integrated circuits configured to output the data signal to the light emitting diode, and the data driving integrated circuit includes a current source, a switch disposed between the current source and the light emitting diode, and to perform switching based on a control signal from the controller, and a coupling compensator configured to output a compensation signal for compensating coupling noise caused based on turn-on or turn-off of the switch.

Meanwhile, the coupling compensator may be disposed between a first node as one node of the current source, into which bias voltage from a bias circuit is input, and a second node as one end of the switch, into which the control signal from the controller is input.

Meanwhile, the coupling compensator may output the compensation signal corresponding to an inverse phase to the coupling noise upon switching of the switch based on the control signal.

Meanwhile, the coupling compensator may output the compensation signal corresponding to a phase of the control signal.

Meanwhile, when the control signal is switched from a low level to a high level, the coupling compensator may output the compensation signal increasing from the third level to the fourth level in response to the coupling noise decreasing from a first level to a second level.

Meanwhile, when the control signal is switched from the high level to the low level, the coupling compensator may output the compensation signal decreasing from a seventh level to an eighth level in response to the coupling noise increasing from a fifth level to a sixth level.

Meanwhile, the current source may outputs first current based on the bias voltage from the bias circuit, and when the switch is turned on based on the control signal, the current source may output the first current to the connected light emitting diode.

Meanwhile, the current source may include a first switching element configured to output the first current based on the bias voltage.

Meanwhile, the coupling compensator may output the compensation signal corresponding to a capacitance of a parasitic capacitor of the first switching element.

Meanwhile, the coupling compensator may include a buffer configured to output the input control signal, and a capacitor connected to the buffer.

Meanwhile, an input node of the buffer may be connected to the second node, an output node of the buffer may be connected to one end of the capacitor, and the other end of the capacitor may be connected to the first node.

Meanwhile, the capacitor in the coupling compensator may include a variable capacitor.

Meanwhile, the buffer in the coupling compensator may include a buffer configured to output a variable-level control signal.

Meanwhile, the image display apparatus according to an embodiment of the present disclosure may further include a bias circuit configured to output the bias voltage to the plurality of data driving integrated circuits.

Meanwhile, the bias circuit may output the bias voltage to the current source in the data driving integrated circuit, and the bias circuit may include a second switching element configured to output the bias voltage based on switching.

In accordance with another aspect of the present disclosure, the above and other objects can be accomplished by providing an image display apparatus which includes: a panel including a plurality of light emitting diodes; and a driving controller configured to output a scan signal and a data signal to the plurality of light emitting diodes, in which the driving controller includes a plurality of data driving integrated circuits configured to output the data signal to the light emitting diode, and the data driving integrated circuit includes a current source, a switch disposed between the current source and the light emitting diode, and to perform switching, and a coupling compensator configured to output a compensation signal for compensating coupling noise caused based on turn-on or turn-off of the switch.

Meanwhile, the driving controller may further include a controller configured to output a control signal to the switch, and a bias circuit configured to output bias voltage to the plurality of data driving integrated circuits.

Meanwhile, the coupling compensator may output the compensation signal corresponding to an inverse phase to the coupling noise upon switching of the switch based on the control signal.

In accordance with yet another aspect of the present disclosure, the above and other objects can be accomplished by providing a video wall including a plurality of image display apparatuses, and the image display apparatus includes: a panel including a plurality of light emitting diodes; a scan driver configured to output a scan signal to the plurality of light emitting diodes; a data driver configured to output a data signal to the plurality of light emitting diodes; and a controller configured to control the data driver, and the data driver includes a plurality of data driving integrated circuits configured to output the data signal to the light emitting diode, and the data driving integrated circuit includes a current source, a switch disposed between the current source and the light emitting diode, and to perform switching based on a control signal from the controller, and a coupling compensator configured to output a compensation signal for compensating coupling noise caused based on turn-on or turn-off of the switch.

In accordance with still yet another aspect of the present disclosure, the above and other objects can be accomplished by providing a video wall including a plurality of image display apparatuses, and the image display apparatus includes: a panel including a plurality of light emitting diodes; and a driving controller configured to output a scan signal and a data signal to the plurality of light emitting diodes, and the driving controller includes a plurality of data driving integrated circuits configured to output the data signal to the light emitting diode, and the data driving integrated circuit includes a current source, a switch disposed between the current source and the light emitting diode, and to perform switching, and a coupling compensator configured to output a compensation signal for compensating coupling noise caused based on turn-on or turn-off of the switch.

BRIEF DESCRIPTION OF THE DRAWINGS

FIGS. 8B to 10B are diagrams referred to in the description of FIG. 8A;

DETAILED DESCRIPTION OF THE PREFERRED EMBODIMENTS

Hereinafter, the present disclosure will be described in detail with reference to the accompanying drawings.

The suffixes “module” and “unit” in elements used in description below are given only in consideration of ease in preparation of the specification and do not have specific meanings or functions. Therefore, the suffixes “module” and “unit” may be used interchangeably.

Figure 1:
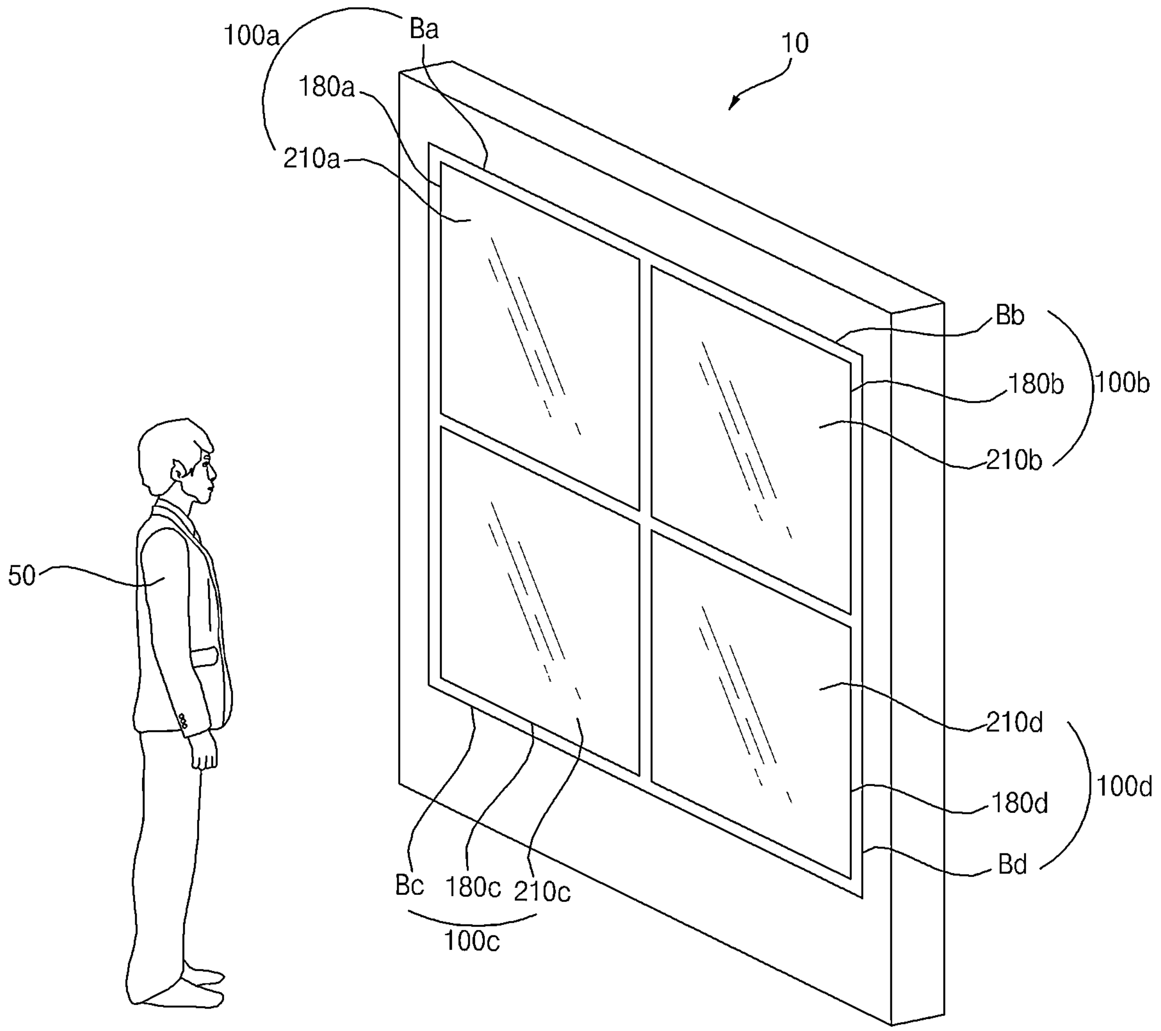
FIG. 1 is a diagram illustrating a video wall according to an embodiment of the present disclosure.

FIG. 1 is a diagram illustrating a video wall according to an embodiment of the present disclosure.

Referring to the drawing, the video wall 10 according to an embodiment of the present disclosure may include a plurality of image display apparatuses 100*a* to 100*d*.

The video wall 10 according to an embodiment of the present disclosure may receive images from the set-top box (not shown), the server (not shown), an internal memory, or the like.

For example, the video wall 10 may receive an image signal from the set-top box (not shown) through an HDMI terminal.

In another example, the video wall 10 may receive an image signal from the server (not shown) through a network terminal.

Meanwhile, the video wall 10 may be installed inside or outside a building.

For example, the video wall 10 may be provided in public places such as vehicles, bus terminals, railroad stations and airports, in order to provide information such as advertisements, news and notices. In addition, the display apparatus may be provided near display windows of department stores, shopping malls or markets, for advertisements of specific products.

In another example, the video wall 10 may be installed on a wall surface in a house.

The video wall 10 may comprise a plurality of displays 180*a* to 180*d* arranged contiguously.

Meanwhile, a plurality of displays 180*a* to 180*d* may be implemented with any one of various panels. For example, the plurality of displays 180*a* to 180*d* may be any one of a liquid crystal display (LCD) panel, a light emitting diode (OLED) panel, an inorganic light emitting diode (LED) panel, and the like.

The following description will be made based on an example in which the plurality of displays 180*a* to 180*d* comprise the inorganic light emitting diode (LED) panel.

Meanwhile, the inorganic light emitting diode (LED) panel includes light emitting diodes, and is advantageous in that it has a fast response speed and can reproduce colors very well.

Meanwhile, the plurality of displays 180*a* to 180*d* may comprise a plurality of panels 210*a* to 210*d* and bezels Ba to Bd surrounding the panels 210*a* to 210*d*, respectively.

In the figure, the video wall 10 includes a plurality of image display apparatuses 100*a* to 100*d* including respective displays 180*a* to 180*d*.

Alternatively, for image display of the video wall 10, signal processing devices 170 to 170*d* provided respectively in the plurality of image display apparatuses 100*a* to 100*d* may be used.

For example, images distributed by the signal processing device 170 may be inputted into the signal processing devices 170 to 170*d* provided respectively in the plurality of image display devices 100*a* to 100*d*, and images whose image signals are processed by the respective signal processing devices 170 to 170*d* may be inputted into the respective displays 180*a* to 180*d*, and the respective displays 180*a* to 180*d* may display the images.

Accordingly, a viewer 50 can view the images displayed through the video wall 10 as shown in the figure. In particular, the viewer can view the images displayed through the plurality of displays 180*a* to 180*d*.

In another example, the video wall 10 may comprise one signal processing device for commonly controlling the plurality of image display apparatuses 100*a* to 100*d*. The common signal processing device may perform signal processing on the displayed image. The processed images may be input to the displays 180*a* to 180*d* and the respective displays 180*a* to 180*d* may display the images.

Meanwhile, in the plurality of displays 180*a* to 180*d*, when an inorganic light emitting panel including a light emitting diode is driven based on a passive matrix scheme, the light emitting diode is emitted or not emitted.

Meanwhile, coupling noise is generated upon outputting a data signal using a plurality of data driving integrated circuits to drive the light emitting diode, so luminance upon emission may become non-uniform between the light emitting diodes.

In particular, when the numbers of light emitting diodes emitted by respective data driving integrated circuits are different, the luminance non-uniformity becomes worse.

Therefore, in the present disclosure, a method is adopted, which may maintain the luminance uniformity between the plurality of light emitting diodes. This will be described in detail with reference to FIG. 12 or below.

Figure 2:
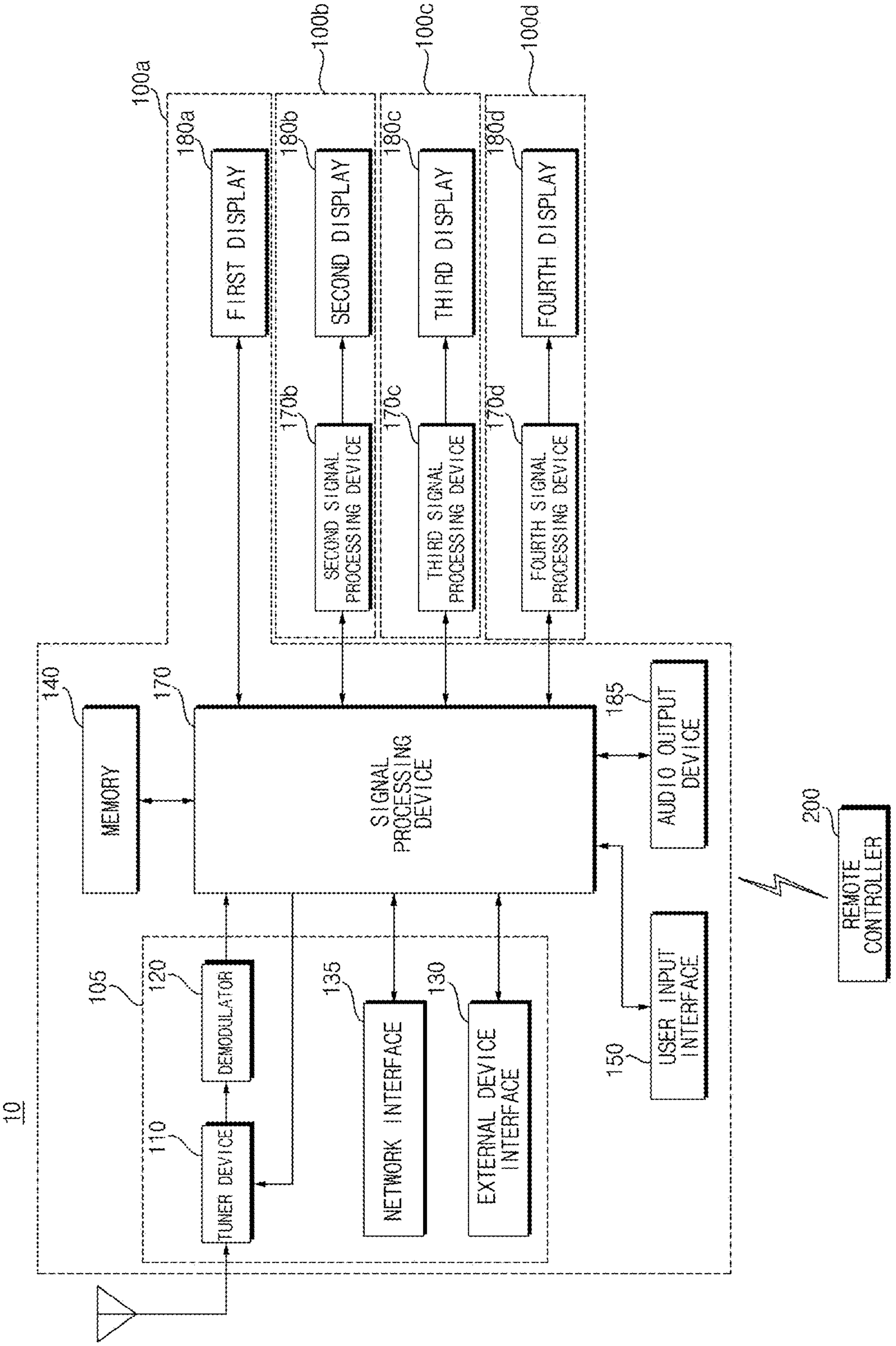
FIG. 2 is an example of an internal block diagram of a video wall of FIG. 1.

FIG. 2 is an example of an internal block diagram of a video wall of FIG. 1.

Referring to the drawing, the video wall 10 may comprise a first to fourth image display apparatuses 100*a* to 100*d*.

In the drawing, an example is illustrated in which the second to fourth image display apparatuses 100*b* to 100*d* have second to fourth displays 180*b* to 180*d*, respectively, or a second to fourth signal processing devices 170*b* to 170*d*, respectively, but may comprise an external device interface, a network interface, a memory, an image divider, a power supply, an audio output device 185, etc., unlike the drawing.

Meanwhile, the first image display apparatus 100*a* may comprise an external device interface 130, a network interface 135, a memory 140, a user input interface 150, a signal processing device 170, a first display device 180*a*, a power supply 190, an audio output device 185, and the like.

The external device interface 130 may serve to transmit or receive data to or from an external device (not shown) connected thereto. The external device interface 130 may comprise an A/V input/output (I/O) device (not shown) or a data input/output module (not shown).

For example, the external device interface 130 may comprise an HDMI port, an RGB port, a component port, a USB port, a micro SD port, etc.

The network interface 135 serves as an interface between the image video wall 100 and a wired/wireless network such as the Internet. For example, the network interface 135 may receive content or data provided by an Internet or content provider or a network operator over a network.

The memory 140 may store various programs necessary for the signal processing device 170 to process and control signals, and may also store processed video, audio and data signals.

Further, the memory 140 may temporarily store a video, audio and/or data signal received from the external device interface 130.

Meanwhile, the plurality of displays 180*a* to 180*d* may be contiguously arranged, may comprise various display panels such as LCDs, OLEDs, PDPs, etc., and may display predetermined images through the display panels.

The user input interface 150 transmits a signal input by the user to the signal processing device 170 or transmits a signal received from the signal processing device 170 to the user.

To this end, the user input interface 150 may comprise a local key comprising a power key, a touch panel for inputting user information, etc.

The signal processing device 170 may divide an input image stored in the memory 140 or an input image received from an external device through the external device interface 130 or the network interface 135 into a plurality of images, for displaying the input image through the plurality of displays 180*a* to 180*d*.

For example, the signal processing device 170 may crop the input image into a plurality of images and scale the images.

In particular, the signal processing device 170 may perform cropping and scaling in consideration of the resolution and size of the plurality of displays 180*a* to 180*d*.

Meanwhile, the signal processing device 170 may perform overall control of the video wall 10, and, more particularly, control operation of the units of the video wall 10.

Meanwhile, the signal processing device 170 may distribute images and send the distributed images to the plurality of signal processing devices 170 to 170*d*.

Meanwhile, at least one signal processing device may be provided in order to control the plurality of displays 180*a* to 180*d*.

Meanwhile, in the figure, the plurality of signal processing devices 170 to 170*d* corresponding to the plurality of displays 180*a* to 180*d* is shown, in order to control the plurality of displays 180*a* to 180*d*.

The plurality of signal processing devices 170 to 170*d* may perform control operation for image display through the plurality of displays 180*a* to 180*d*.

The plurality of signal processing devices 170 to 170*d* may process an input image signal and send the processed image signal to the plurality of displays 180*a* to 180*d*, respectively.

That is, each of the plurality of signal processing devices 170 to 170*d* may control the plurality of displays 180*a* to 180*d* to output a predetermined image. More specifically, RGB signals corresponding to a video image to be displayed may be output through the plurality of displays 180*a* to 180*d*. Thus, the plurality of displays 180*a* to 180*d* may display respective images.

The power supply 190 may receive external or internal power and supply power necessary for operation of the components.

The power supply 190 supplies power to the image video wall 100 and, more particularly, the plurality of signal processing devices 170 to 170*d* implemented in the form of a system on chip (SOC), the plurality of displays 180*a* to 180*d* for displaying video, and the audio output device 185 for outputting audio.

A temperature sensor (not shown) may sense the temperature of the video wall 10.

The temperature sensed by the temperature sensor (not shown) may be inputted to at least one of the plurality of signal processing devices 170 to 170*d*, and at least one of the plurality of signal processing devices 170 to 170*d* may control operation of a fan driver (not shown) in order to reduce internal heat based on the sensed temperature.

Meanwhile, the image display apparatus 100*a* according to an embodiment of the present disclosure may include an image receiver 105, a memory 140, a user input interface 150, a sensor part (not shown), a signal processing device 170, a display device 180, and an audio output device 185.

The image receiver 105 may comprise a tuner 110, a demodulator 120, a network interface 135, and an external device interface 130.

Meanwhile, unlike the drawing, the image receiver 105 may comprise only the tuner 110, the demodulator 120, and the external device interface 130. That is, the network interface 135 may not be comprised.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner 110 can process a digital broadcast signal or an analog broadcast signal. The analog baseband image or audio signal (CVBS/SIF) output from the tuner 110 may be directly input to the signal processing device 170.

Meanwhile, the tuner 110 can comprise a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a demultiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display device 180 and outputs audio to the audio output device 185.

The external device interface 130 may transmit or receive data with a connected external apparatus (not shown), e.g., a set-top box 50. To this end, the external device interface 130 may comprise an A/V input and output device (not shown).

The external device interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless communication device (not shown) may perform short-range wireless communication with other electronic apparatus.

Through the wireless communication device (not shown), the external device interface 130 may exchange data with an adjacent mobile terminal (not shown). In particular, in a mirroring mode, the external device interface 130 may receive device information, executed application information, application image, and the like from the mobile terminal (not shown).

The network interface 135 provides an interface for connecting the image display apparatus 100 to a wired/wireless network comprising the Internet network. For example, the network interface 135 may receive, via the network, content or data provided by the Internet, a content provider, or a network operator.

Meanwhile, the network interface 135 may comprise a wireless communication device (not shown).

The memory 140 may store a program for each signal processing and control in the signal processing device 170, and may store a signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 2 illustrates that the memory 140 is provided separately from the signal processing device 170, the scope of the present disclosure is not limited thereto. The memory 140 may be comprised in the signal processing device 170.

The user input interface 150 transmits a signal input by the user to the signal processing device 170 or transmits a signal from the signal processing device 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner 110, the demodulator 120, the network interface 135, or the external device interface 130, or process the demultiplexed signals to generate and output a signal for image or audio output.

For example, the signal processing device 170 receives a broadcast signal received by the image receiver 105 or an HDMI signal, and perform signal processing based on the received broadcast signal or the HDMI signal to thereby output a signal-processed image signal.

The image signal processed by the signal processing device 170 is input to the display device 180, and may be displayed as an image corresponding to the image signal. In addition, the image signal processed by the signal processing device 170 may be input to the external output apparatus through the external device interface 130.

The audio signal processed by the signal processing device 170 may be output to the audio output device 185 as an audio signal. In addition, audio signal processed by the signal processing device 170 may be input to the external output apparatus through the external device interface 130.

Although not shown in FIG. 2, the signal processing device 170 may comprise a demultiplexer, an image processor, and the like. That is, the signal processing device 170 may perform a variety of signal processing and thus it may be implemented in the form of a system on chip (SOC). This will be described later with reference to FIG. 3.

In addition, the signal processing device 170 can control the overall operation of the image display apparatus 100. For example, the signal processing device 170 may control the tuner 110 to control the tuning of the RF broadcast corresponding to the channel selected by the user or the previously stored channel.

In addition, the signal processing device 170 may control the image display apparatus 100 according to a user command input through the user input interface 150 or an internal program.

Meanwhile, the signal processing device 170 may control the display device 180 to display an image. At this time, the image displayed on the display device 180 may be a still image or a moving image, and may be a 2D image or a 3D image.

Meanwhile, the signal processing device 170 may display a certain object in an image displayed on the display device 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display device 180 corresponding to a user position can be determined.

The display device 180 generates a driving signal by converting an image signal, a data signal, an OSD signal, a control signal processed by the signal processing device 170, an image signal, a data signal, a control signal, and the like received from the external device interface 130.

Meanwhile, the display device 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a signal processing device 170 which can be implemented in the form of a system on chip (SOC), a display device 180 for displaying an image, and an audio output device 185 for outputting an audio.

Specifically, the power supply 190 may comprise a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
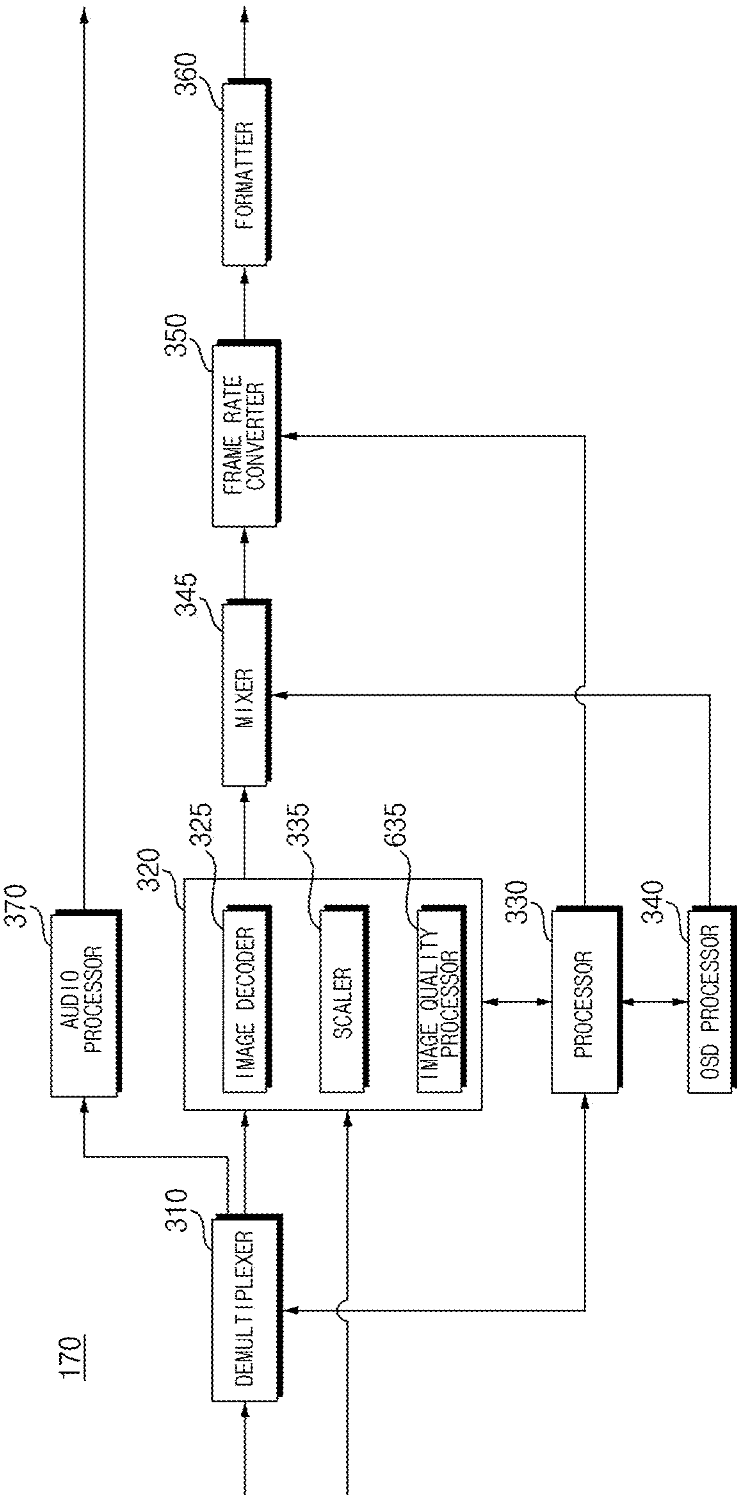
FIG. 3 is an example of an internal block diagram of an image display apparatus of FIG. 1.

FIG. 3 is an example of an internal block diagram of a signal processing device of FIG. 2.

Referring to the drawing, the signal processing device 170 according to an embodiment of the present disclosure may comprise a demultiplexer 310, an image processor 320, a processor 330, and an audio processor 370. In addition, the signal processing device 170 may further comprise and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner 110, the demodulator 120, or the external device interface 130.

The image processor 320 may perform signal processing on an input image. For example, the image processor 320 may perform image processing on an image signal demultiplexed by the demultiplexer 310.

To this end, the image processor 320 may comprise an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display device 180.

The image decoder 325 can comprise a decoder of various standards. For example, a 3D image decoder for MPEG-2, H.264 decoder, a color image, and a depth image, and a decoder for a plurality of view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 635 may perform noise reduction processing on an input image signal, extend a resolution of high gray level of the input image signal, perform image resolution enhancement, perform high dynamic range (HDR)-based signal processing, change a video frame rate, or perform image quality processing appropriate for properties of a panel, especially a light emitting diode panel, etc.

The OSD processor 340 generates an OSD signal according to a user input or by itself. For example, based on a user input signal, the OSD processor 340 may generate a signal for displaying various information as a graphic or a text on the screen of the display device 180. The generated OSD signal may comprise various data such as a user interface screen of the image display apparatus 100, various menu screens, a widget, and an icon. In addition, the generated OSD signal may comprise a 2D object or a 3D object.

In addition, the OSD processor 340 may generate a pointer that can be displayed on the display, based on a pointing signal input from the remote controller 200. In particular, such a pointer may be generated by a pointing controller, and the OSD processor 240 may comprise the pointing controller (not shown). Obviously, the pointing controller (not shown) may be provided separately from the OSD processor 240.

The Frame Rate Converter (FRC) 350 may convert a frame rate of the input image. The frame rate converter 350 may output the image as it is without separate frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processing device 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external device interface 130.

In addition, the processor 330 may control the demultiplexer 310, the image processor 320, and the like in the signal processing device 170.

Meanwhile, the audio processor 370 in the signal processing device 170 may perform the audio processing of the demultiplexed audio signal. To this end, the audio processor 370 may comprise various decoders.

In addition, the audio processor 370 in the signal processing device 170 may process a base, a treble, a volume control, and the like.

The data processor (not shown) in the signal processing device 170 may perform data processing of the demultiplexed data signal. For example, when the demultiplexed data signal is a coded data signal, it can be decoded. The encoded data signal may be electronic program guide information comprising broadcast information such as a start time and an end time of a broadcast program broadcasted on each channel.

Figure 4:
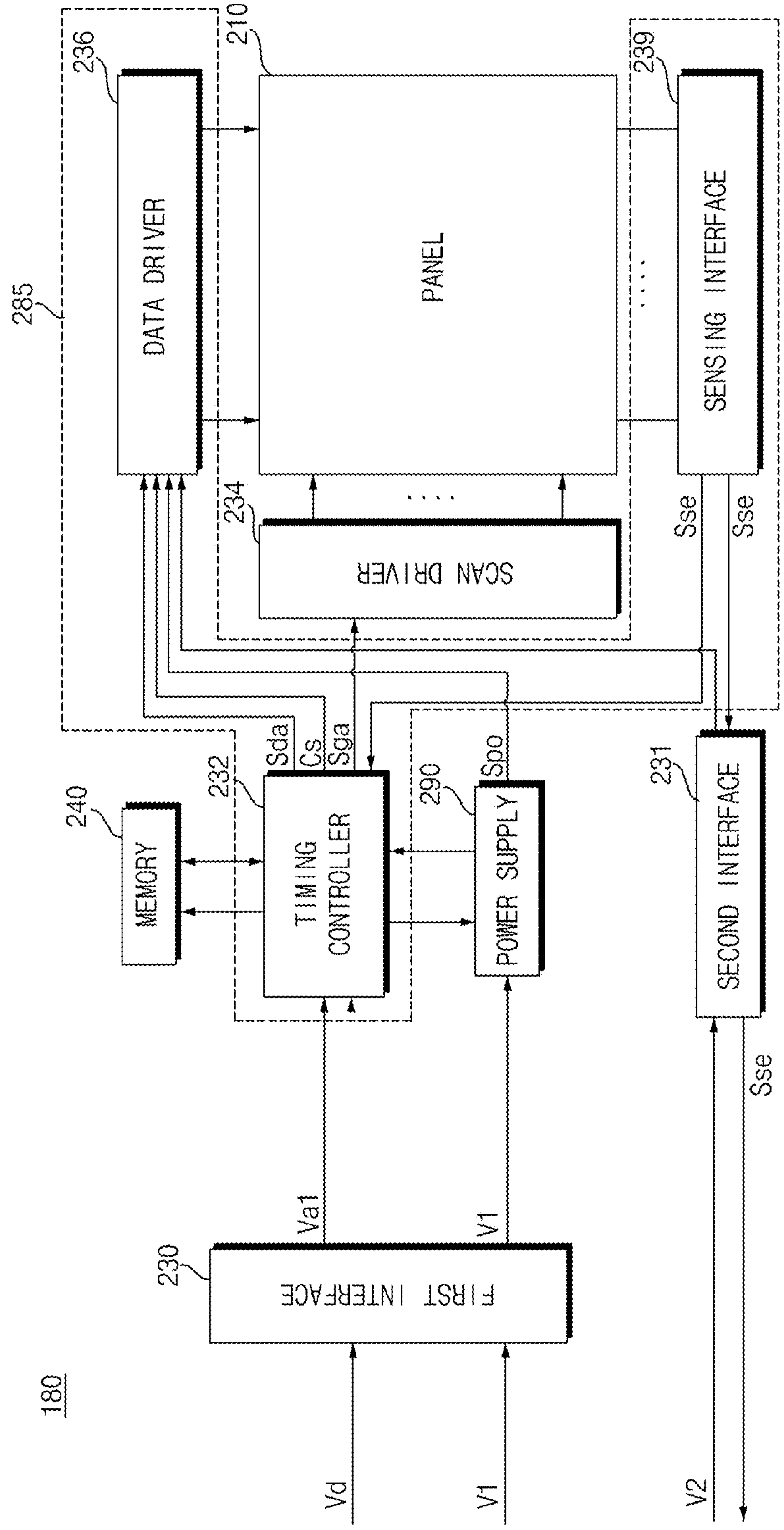
FIG. 4 is an internal block diagram of a display of FIG. 2.

Meanwhile, a block diagram of the signal processing device 170 shown in FIG. 4 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the image processor 320.

FIG. 4 is an internal block diagram of a display of FIG. 2.

Referring to the drawing, the light emitting diode panel-based display device 180 may include a light emitting diode panel 210, a first interface 230, a second interface 231, a timing controller 232, a scan driver 234, a data driver 236, a memory 240, a power supply 290, and the like.

The display device 180 receives an image signal Vd, a first DC power V1, and a second DC power V2, and may display a certain image based on the image signal Vd.

Meanwhile, the first interface 230 in the display device 180 may receive the image signal Vd and the first DC power V1 from the signal processing device 170.

Here, the first DC power V1 may be used for the operation of the power supply 290 and the timing controller 232 in the display device 180.

Next, the second interface 231 may receive a second DC power V2 from an external power supply 190. Meanwhile, the second DC power V2 may be input to the data driver 236 in the display device 180.

The timing controller 232 may output a data driving signal Sda and a scan driving signal Sga, based on the image signal Vd.

For example, when the first interface 230 converts the input image signal Vd and outputs the converted image signal va1, the timing controller 232 may output the data driving signal Sda and the scan driving signal Sga based on the converted image signal va1.

The timing controller 232 may further receive a control signal, a vertical synchronization signal Vsync, and the like, in addition to the image signal Vd from the signal processing device 170.

In addition to the image signal Vd, based on a control signal, a vertical synchronization signal Vsync, and the like, the timing controller 232 generates a scan driving signal Sga for the operation of the scan driver 234, and a data driving signal Sda for the operation of the data driver 236.

At this time, when the panel 210 comprises a RGB subpixel, the data driving signal Sda may be a data driving signal for driving of RGB subpixel.

Meanwhile, the timing controller 232 may further output a control signal Cs to the scan driver 234.

The scan driver 234 and the data driver 236 supply a scan signal and a data signal to the light emitting diode panel 210 through a scan line GL and a data line DL respectively, according to the scan driving signal Sga and the data driving signal Sda from the timing controller 232. Accordingly, the light emitting diode panel 210 displays a certain image.

Meanwhile, the light emitting diode panel 210 may include a light emitting layer. In order to display an image, a plurality of scan lines GL and data lines DL may be disposed in a matrix form in each pixel corresponding to the light emitting layer.

Meanwhile, the scan line GL may be called a scan line since a scan signal is inputted through it.

Meanwhile, the data driver 236 may output a data signal to the light emitting diode panel 210 based on a second DC power V2 from the second interface 231.

The power supply 290 may supply various power supplies to the scan driver 234, the data driver 236, the timing controller 232, and the like.

Meanwhile, in the drawing, the timing controller 232, the scan driver 234, and the data driver 236 may be implemented as a single integrated circuit IC.

Accordingly, the timing controller 232, the scan driver 234, and the data driver 236 may be called a driving controller 285.

Meanwhile, the driving controller 285 may include a buffer 238 storing frame data.

In particular, the timing controller 232 in the driving controller 285 may output a scan driving signal and a data driving signal based on the frame data stored in the buffer 238.

Figure 5A:
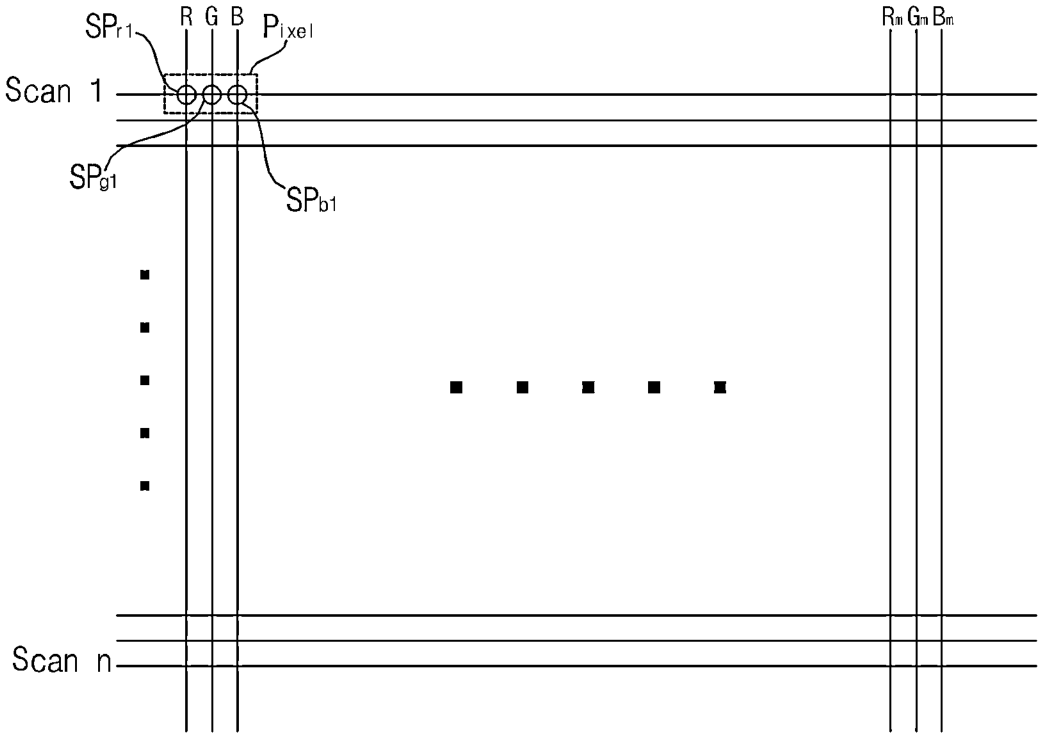
FIGS. 5A to 5C are diagrams referred to in the description of a light emitting diode panel of FIG. 4.
Figure 5B:
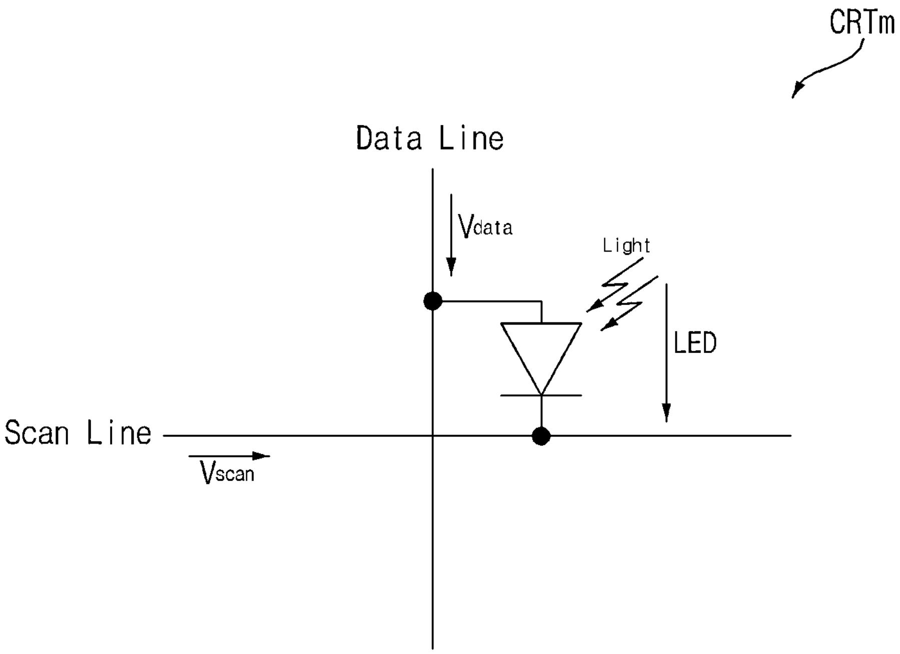

FIG. 5A and FIG. 5B are diagrams referred to in the description of a light emitting diode panel of FIG. 4.

Firstly, FIG. 5A is a diagram illustrating a pixel in the light emitting diode panel 210.

Referring to drawing, the light emitting diode panel 210 may include a plurality of scan lines Scan 1 to Scan n and a plurality of data lines R1, G1, and B1 to Rm, Gm, and Bm intersecting the scan lines.

Meanwhile, a pixel (subpixel) is defined in an intersecting area of the scan line and the data line in the light emitting diode panel 210. In the drawing, a pixel comprising subpixels SR1, SG1, and SB1 of RGB is shown.

Meanwhile, a red light emitting diode, a green light emitting diode, and a blue light emitting diode are disposed in the subpixels SR1, SG1, and SB1 of RGB.

FIG. 5B illustrates a circuit of any one sub-pixel in the pixel of the light emitting diode panel of FIG. 5A.

Referring to the drawing, a light emitting sub pixel circuit (CRTm) may be passive type, and may include a light emitting diode LED alone without a switching element.

As shown in the drawing, an anode of the light emitting diode LED may be connected to a data line through which a data signal Vdata is inputted, and a cathode of the light emitting diode LED may be connected to a scan line through which a scan signal Vscan is inputted.

Meanwhile, the light emitting diode may emit light or not, based on a plurality of subframes based on the passive matrix scheme.

Figure 5C:
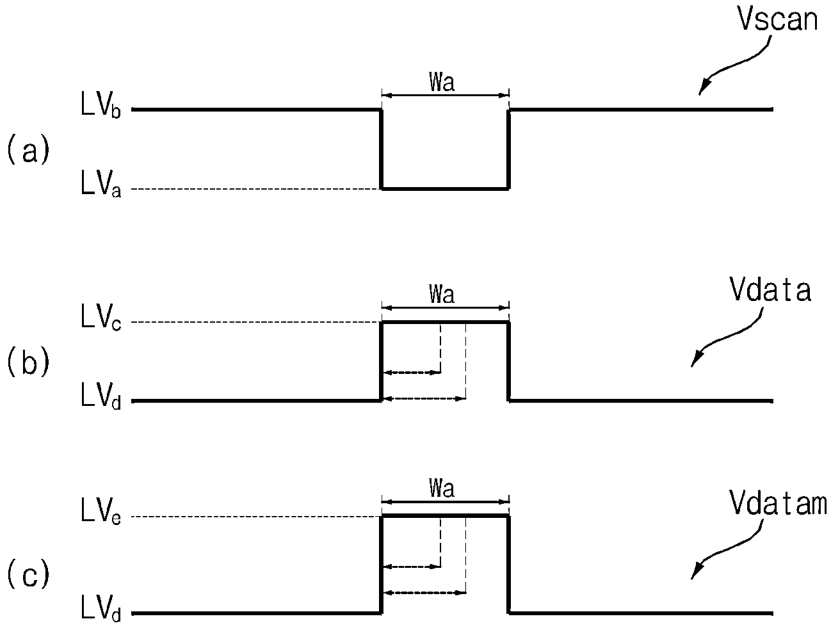

FIG. 5C is a diagram showing an example of a scan signal and data signals.

Referring to the drawing, a scan signal Vscan applied to a red light emitting diode, a green light emitting diode, and a blue light emitting diode maintains LVb level and then drops to LVa level at a scan timing.

In this case, the width of the scan signal Vscan may be set to Wa.

Meanwhile, the red light emitting diode may have higher luminance efficiency than the green light emitting diode and the blue light emitting diode because of the device characteristics.

In response to this, the driving controller 285 may be configured to control the level of a data signal supplied to the red light emitting diode to be lower than the level of a data signal supplied to the green light emitting diode or the blue light emitting diode.

(b) of FIG. 5C illustrates a data signal Vdata which maintains LVd level and rises to LVc level in response to a scan timing of the scan signal Vscan.

(c) of FIG. 5C illustrates a data signal Vdatam which maintains LVd level and rises to LVe level which is higher than LVc level in response to a scan timing of the scan signal Vscan.

The data signal Vdata of LVc level may be applied to the red light emitting diode, and the data signal Vdatam of LVe level which is higher than LVc level may be applied to the green light emitting diode or the blue light emitting diode.

Accordingly, a data signal corresponding to a light emitting diode can be outputted, and furthermore uniform colors can be rendered.

Meanwhile, the data signal Vdata in (b) of FIG. 5C or the data signal Vdatam in (c) of FIG. 5C are data signal based on pulse width modulations, and the luminance of the light emitting diodes varies with variations in duty corresponding to pulse width.

Figure 6:
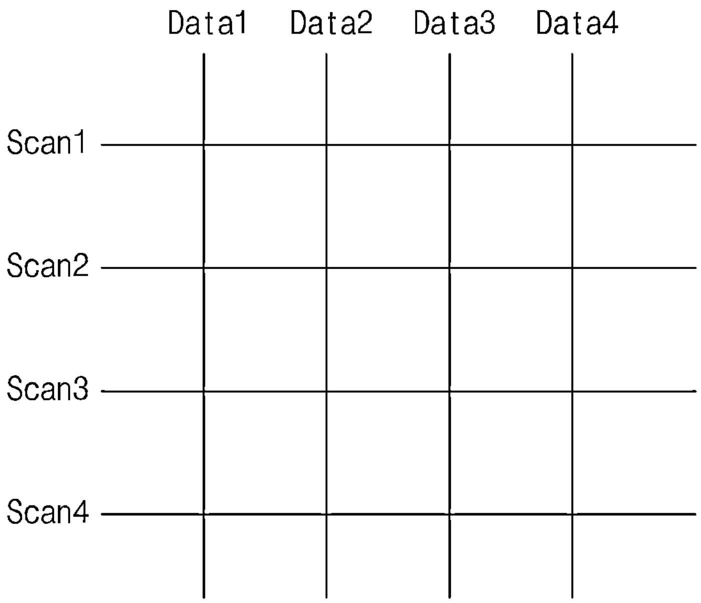
FIG. 6 is a diagram illustrating an example of the light emitting diode panel of FIG. 4.

FIG. 6 is a diagram illustrating an example of the light emitting diode panel of FIG. 4.

Referring to the drawing, the light emitting diode panel 210 may include a plurality of data lines and a plurality of scan lines.

In FIG. 6, as an example of the light emitting diode panel 210, four data lines Data1 to Data4 and four scan lines Scan1 to Scan4 are illustrated for convenience of explanation.

Figure 7A:
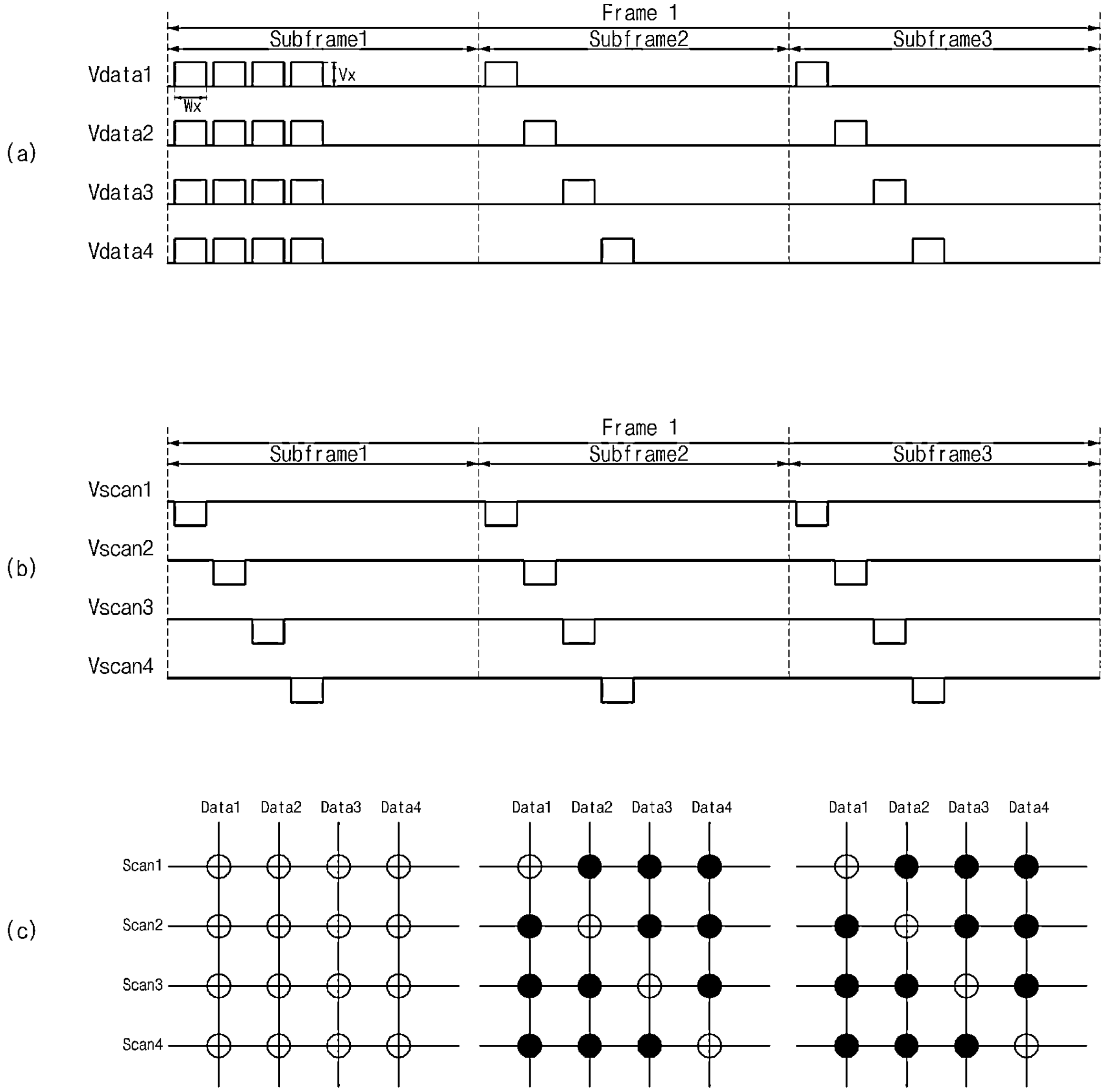
FIGS. 7A to 7C are diagrams referred to in the description of an operation of an image display apparatus related to the present disclosure.
Figure 7B:
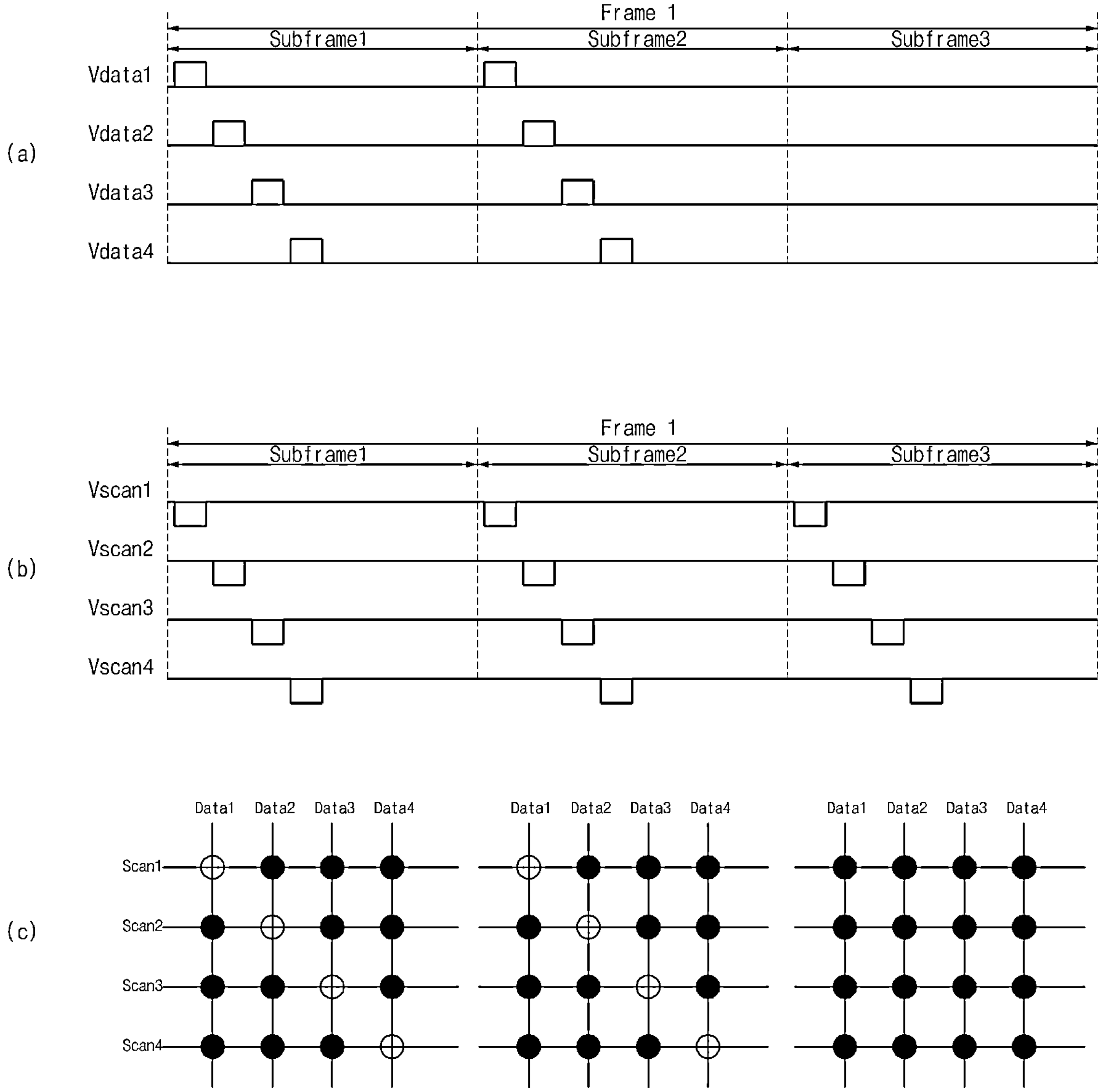
Figure 7C:
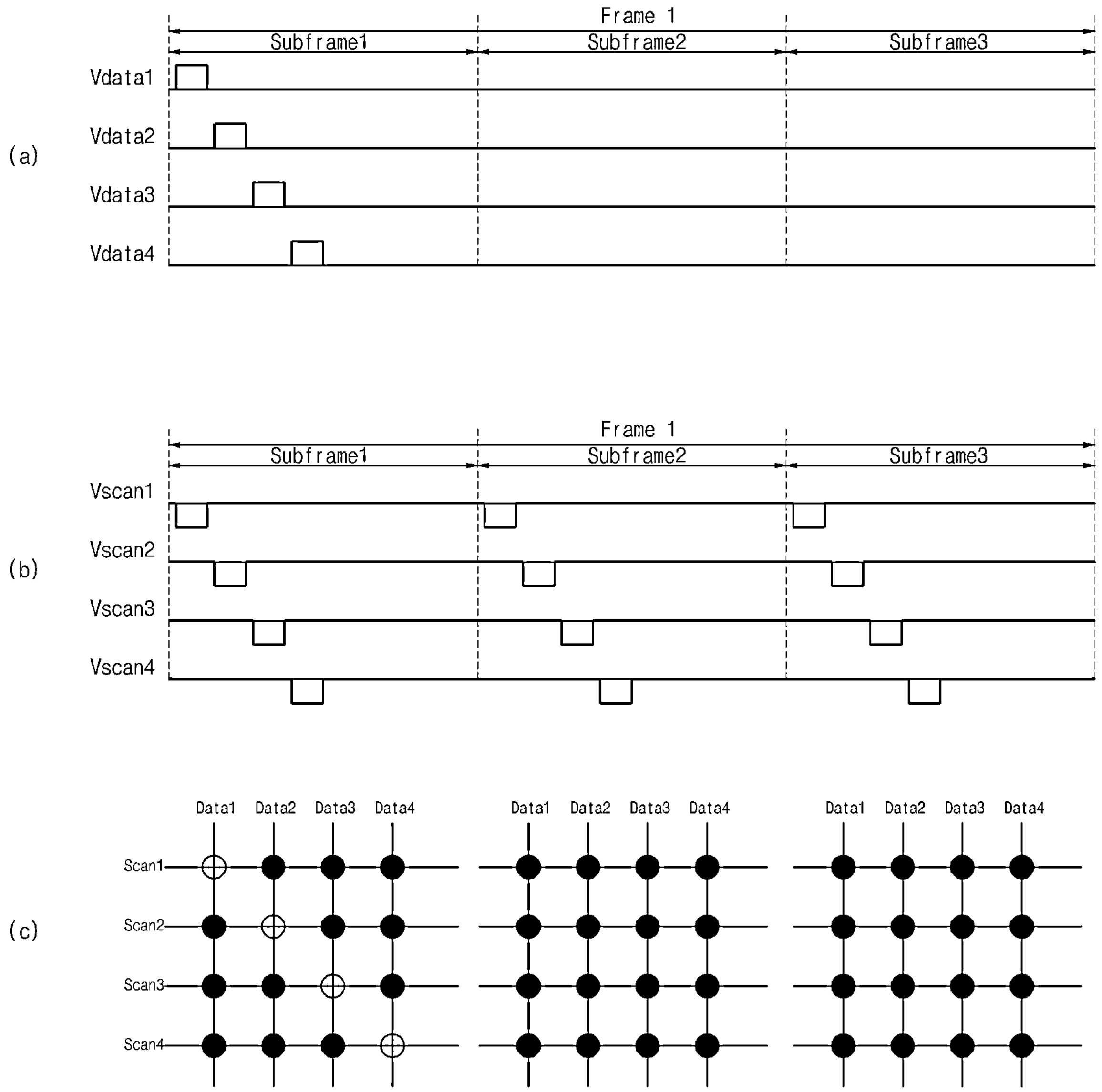

FIGS. 7A to 7C are diagrams referred to in the description of an operation of an image display apparatus related to the present disclosure.

FIG. 7A illustrates an example of a data signal applied when a frame has a first gray level, during a plurality of subframe periods within a frame period.

Referring to the drawings, a plurality of subframe periods Subframes 1 to 3 may be included within a frame period Frame 1.

Although the drawing illustrates a plurality of subframe periods Subframes 1 to 3 within a frame period Frame 1 for convenience of explanation, many variations may be made.

(a) of FIG. 7A illustrates that data signals Vdata 1 to 4 are respectively applied to the four data lines shown in FIG. 6 during the first subframe period Subframe 1 which is one of the plurality of subframe periods Subframes 1 to 3.

In the drawing, data signals Vdata 1 to 4 each having four pulses or voltages Vx are respectively applied to four data lines during the first subframe period Subframe 1.

In this case, the pulse width of the data signals Vdata 1 to 4 may be Wx.

(b) of FIG. 7A illustrates that scan signals Vscan 1 to 4 are sequentially applied to four scan data lines during the first subframe period Subframe 1.

Accordingly, as shown in (c) of FIG. 7A, sixteen light emitting diodes emit light during the first subframe period Subframe 1.

(a) of FIG. 7A illustrates that data signals Vdata 1 to 4 are respectively applied to the four data lines shown in FIG. 6 during the second subframe period Subframe 2.

In the drawing, data signals Vdata 1 to 4 each having one pulse or voltage Vx are respectively applied to four data lines during the second subframe period Subframe 2.

(b) of FIG. 7A illustrates that scan signals Vscan 1 to 4 are sequentially applied to four scan lines during the second subframe period Subframe 2.

Accordingly, as shown in (c) of FIG. 7A, four light emitting diodes in a diagonal orientation emit light during the second subframe period Subframe 2.

(a) of FIG. 7A illustrates that data signals Vdata 1 to 4 are respectively applied to the four data lines shown in FIG. 6 during the third subframe period Subframe 3.

In the drawing, data signals Vdata 1 to 4 each having one pulse or voltage Vx are respectively applied to four data lines during the third subframe period Subframe 3.

(b) of FIG. 7A illustrates that scan signals Vscan 1 to 4 are sequentially applied to four scan lines during the third subframe period Subframe 3.

Accordingly, as shown in (c) of FIG. 7A, four light emitting diodes in a diagonal orientation emit light during the third subframe period Subframe 3.

FIG. 7B illustrates an example of a data signal applied when a frame has a second gray level which is lower than the first gray level, during a plurality of subframe periods within a frame period.

(a) FIG. 7B illustrates that data signals Vdata 1 to 4 are applied to four data lines illustrated in FIG. 6, respectively during a first subframe period Subframe 1 among the plurality of subframe periods Subframes 1 to 3.

In the drawing, data signals Vdata 1 to 4 are illustrated, which have four pulses or voltages Vx in four data lines, respectively during the Subframe 1 period.

In this case, pulse widths of the data signals Vdata 1 to 4 may be Wx.

(b) of FIG. 7B illustrates that scan signals Vscan 1 to 4 are sequentially applied to four scan lines during the plurality of subframe periods Subframes 1 to 3.

Accordingly, during the first subframe period Subframe 1, 16 light emitting diodes are emitted as illustrated in (c) of FIG. 7B.

Meanwhile, (a) of FIG. 7B illustrates that data signals Vdata 1 to 4 having one pulse or voltage Vx are applied to four data lines illustrated in FIG. 6, respectively during a second subframe period Subframe 2 among the plurality of subframe periods Subframes 1 to 3, and the pulse or voltage Vx is not applied during a third subframe period Subframe 3.

Accordingly, during the second subframe period Subframe 2, 4 light emitting diodes in a diagonal direction are emitted as illustrated in (c) of FIG. 7B, and during the third subframe period Subframe 3, 16 light emitting diodes are all turned off, and not emitted.

As illustrated in FIG. 7B, when the plurality of light emitting diodes is turned off and not emitted during some periods among a plurality of subframes Subframes 1 to 3, a flicker phenomenon may occur.

FIG. 7C illustrates an example of a data signal applied in response to a case where a frame gray level is a third gray level lower than a second gray level during a plurality of subframe periods within a frame period.

(a) of FIG. 7C illustrates that data signals Vdata 1 to 4 having one pulse or voltage Vx are applied to four data lines illustrated in FIG. 6, respectively during a first subframe period Subframe 1 among the plurality of subframe periods Subframes 1 to 3, and the pulse or voltage Vx is not applied during the second subframe period Subframe 2 and the third subframe period Subframe 3.

(b) of FIG. 7C illustrates that scan signals Vscan 1 to 4 are sequentially applied to 4 scan lines, respectively during the plurality of subframe periods Subframes 1 to 3.

Accordingly, during the first subframe period Subframe 1, 4 light emitting diodes in the diagonal direction are emitted as illustrated in (c) of FIG. 7C, and during the second subframe period Subframe 2 and the third subframe period Subframe 3, 16 light emitting diodes are all turned off, and not emitted.

As illustrated in FIG. 7C, when the plurality of light emitting diodes is turned off and not emitted during some periods among a plurality of subframes Subframes 1 to 3, the flicker phenomenon may occur.

In particular, compared to FIG. 7B, in the case of FIG. 7C, since a diode non-emission period becomes longer, a flicker occurrence possibility increases.

Figure 8A:
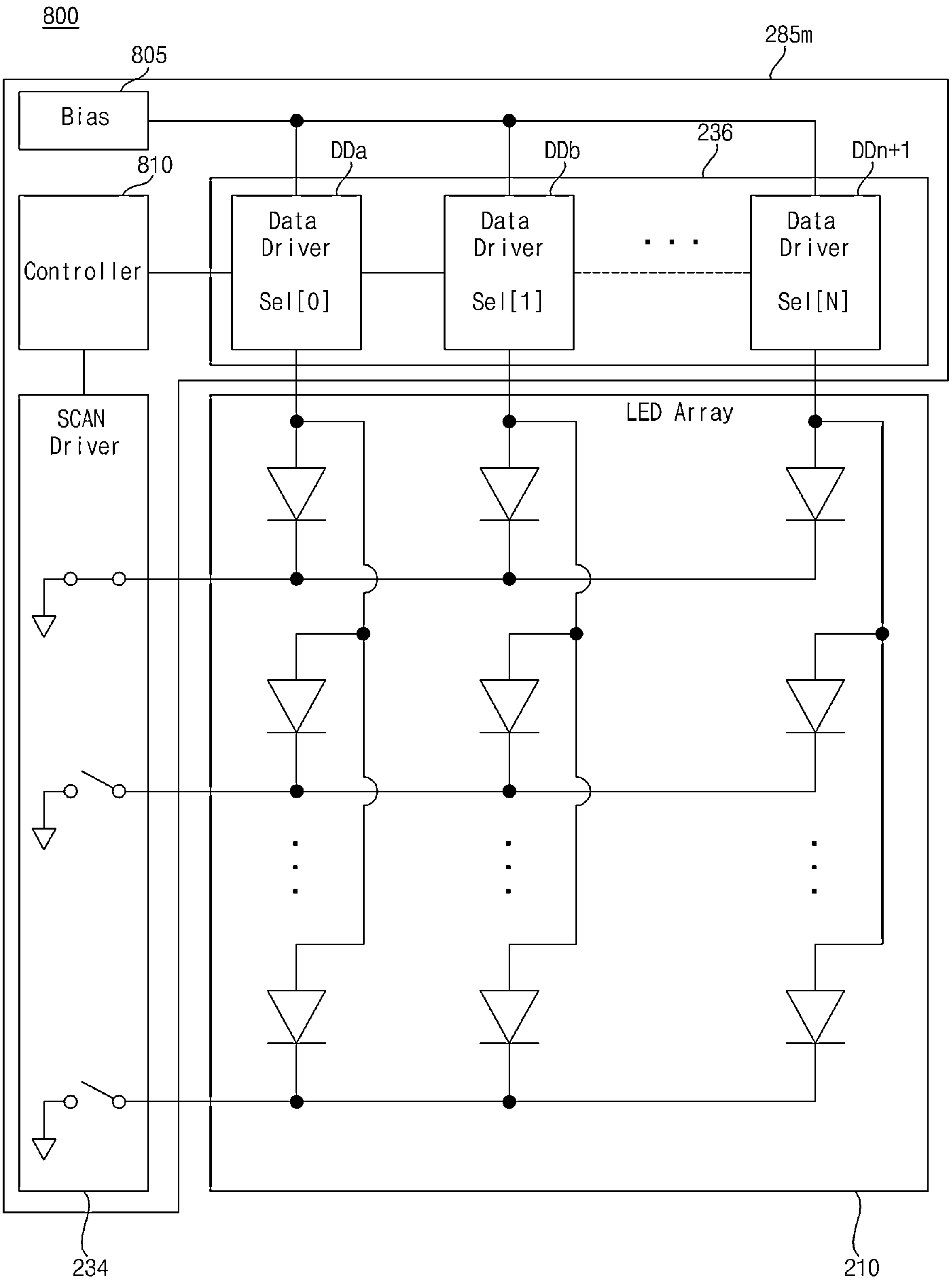
FIG. 8A illustrates an example of an internal block diagram of an image display apparatus according to an embodiment of the present disclosure.

FIG. 8A illustrates an example of an internal block diagram of an image display apparatus according to an embodiment of the present disclosure.

Referring to the drawing, the image display apparatus 800 according to an embodiment of the present disclosure includes a panel 210 including a plurality of light emitting diodes, a scan driver 234 outputting a scan signal to the plurality of light emitting diodes, a data driver 236 outputting a data signal to the plurality of light emitting diodes, and a controller 810 controlling the data driver 236.

Meanwhile, the controller 810 may control the scan driver 234.

Meanwhile, the data driver 236 includes a plurality of data driving integrated circuits DDa to DDn+1 that outputs the data signal to a light emitting diode LED.

Meanwhile, the image display apparatus 800 according to an embodiment of the present disclosure may further include a bias circuit 805 that outputs bias voltage VSG.

Meanwhile, the scan driver 234, the data driver 236, the controller 810, and the bias circuit 805 may be included in a driving controller 285*m*.

Meanwhile, in the drawing, it is illustrated that the plurality of light emitting diodes is disposed in a matrix form, and a plurality of switching elements for applying the scan signal to a horizontal line is disposed in the scan driver 234.

Meanwhile, the data driving integrated circuits DDa to DDn+1 in the data driver 236 may apply the data signal to light emitting diodes disposed on one vertical line, respectively, but the present disclosure is not limited thereto.

For example, it is also possible that the respective data driving integrated circuits DDa to DDn+1 apply the data signal to the light emitting diodes disposed on a plurality of vertical lines.

Figure 8B:
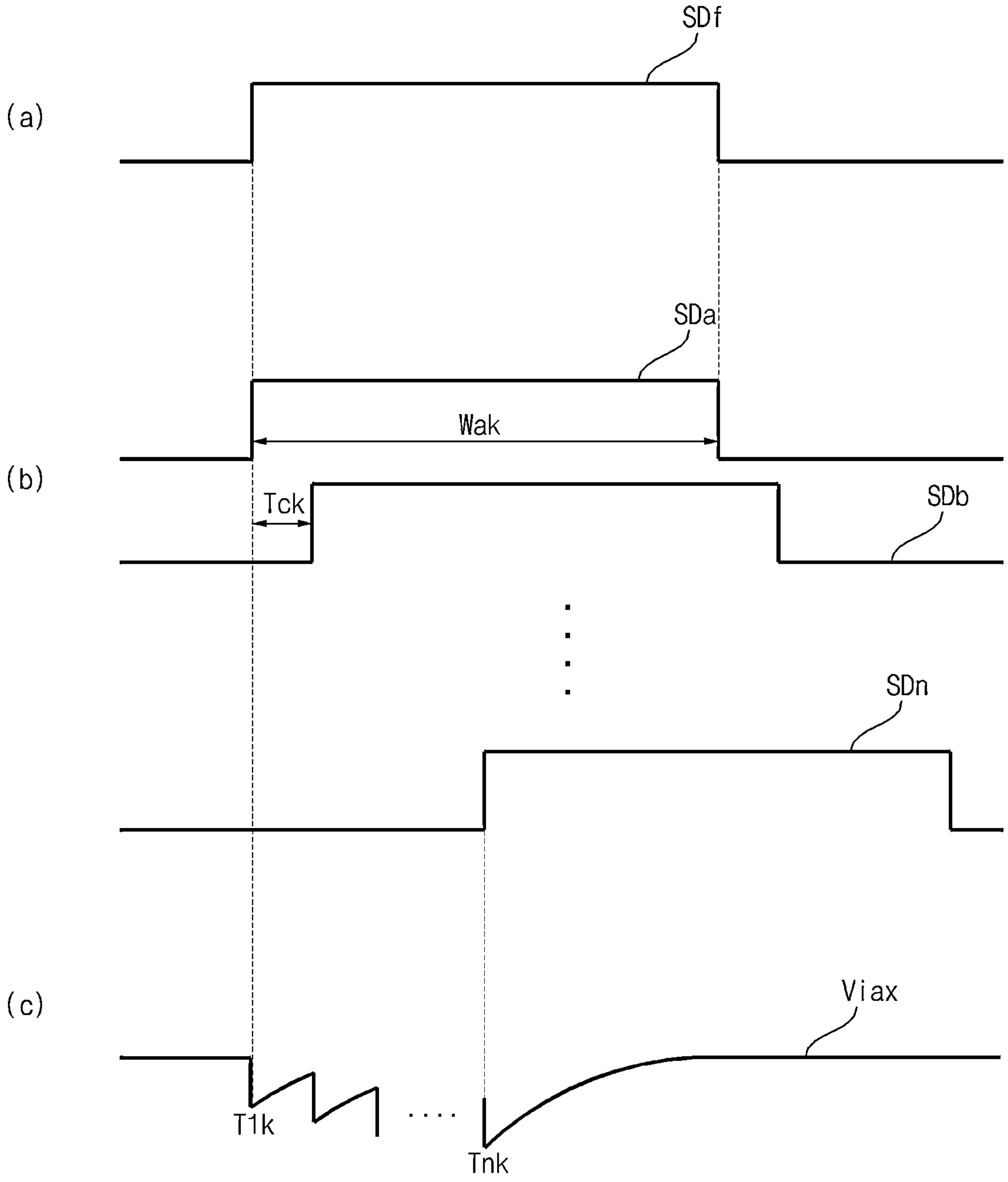

FIG. 8B illustrates an example of the data signal of each of the data driving integrated circuits DDa to DDn+1.

Referring to the drawing, (a) of FIG. 8B illustrates an example of a data signal SDf.

(b) of FIG. 8B illustrates a plurality of data signals SDa, SDb, . . . , SDn sequentially output from the respective data driving integrated circuits DDa to DDn+1.

A pulse width of each data signal may be Wak, and an interval between the respective data signals may be Tck.

Meanwhile, the bias circuit 805 of FIG. 8A illustrates an example of bias voltage to which noise is added due to the plurality of data signals SDa, SDb, . . . , SDn.

Referring to the drawing, as illustrated in (b) of FIG. 8B, when the plurality of data signals SDa, SDb, . . . , SDn is output at an interval of Tck, the noise may be added to the bias voltage at every Tck interval by switching for applying the data signal at every Tck interval.

That is, as in (c) of FIG. 8B, a bias voltage waveform Viax to which the noise is added from a time point T1*k* to a time point Tnk may be shown.

Meanwhile, a noise amount of the noise applied to the bias voltage waveform Viax may be different for each channel, that is, for each of the data driving integrated circuits DDa to DDn+1.

Due to the noise, the luminance uniformity between the plurality of light emitting diodes significantly deteriorates.

Figure 9A:
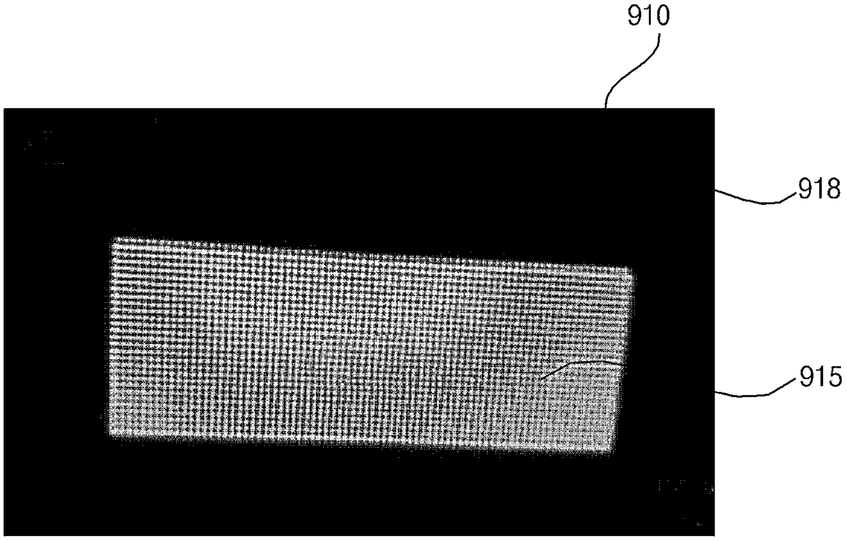
Figure 9B:
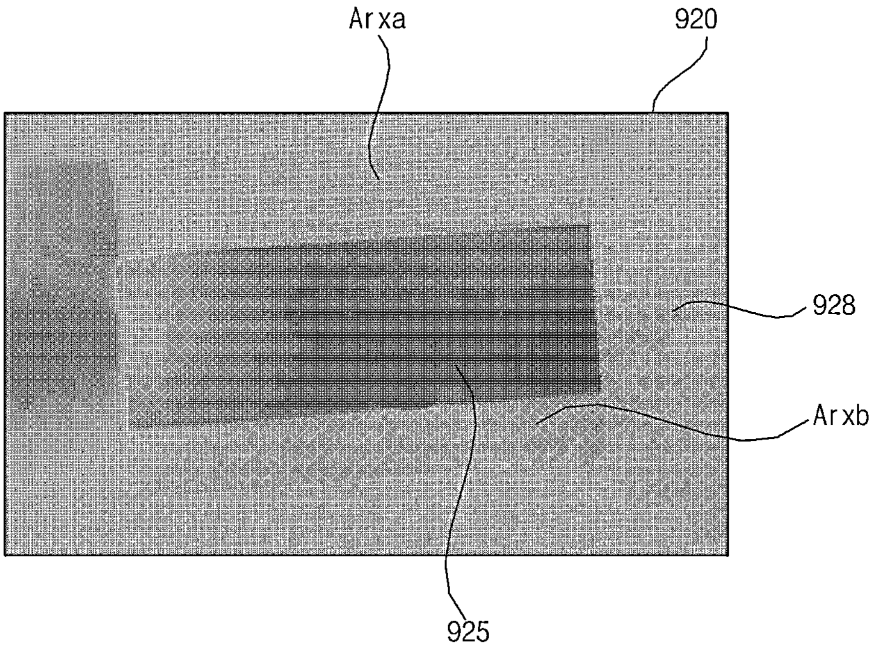
Figure 9C:
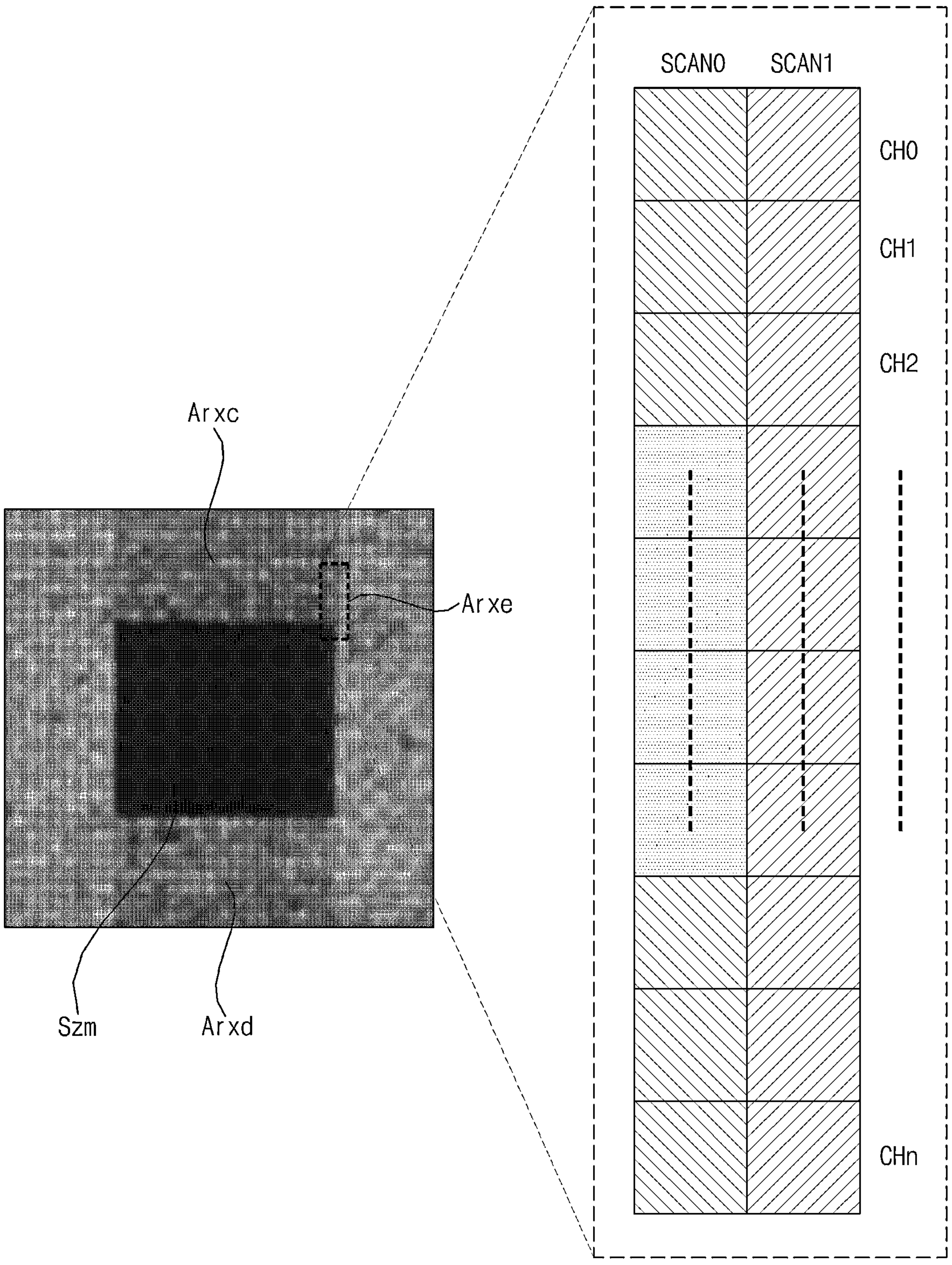

FIGS. 9A to 9C illustrate various examples of crosstalk shown upon applying the data signal based on the same pulse width.

FIG. 9A illustrates that a first image 910 is displayed in the image display apparatus 100.

Referring to the drawing, the first image 910 may include a first area 915 having a first gray level, and a second area 918 surrounding the first area 915, and having a second gray level lower than the first gray level.

FIG. 9B illustrates that a second image 920 is displayed in the image display apparatus 100.

Referring to the drawing, the second image 920 may include a third area 925 having a third gray level lower than the first gray level and the second gray level, and a fourth area 928 surrounding the third area 925 and having a fourth gray level higher than the third gray level.

Meanwhile, referring to FIG. 9B, an area Arxa is generated around the third area 925, which is recognized as an area having a fifth gray level higher than the fourth gray level of the fourth area 928.

Such an area Arxa may be generated due to a difference of a light emitting diode which is turned on or off on a horizontal line or a vertical line.

Such an area Arxa may be referred to as a crosstalk area.

FIG. 9C is a diagram illustrating a difference in number of light emitting diodes which are turned on between adjacent scan lines.

Referring to the drawing, when a size of an area in charge of one data driving integrated circuit is Szm, crosstalk may occur in an upper area Arxc and a lower area Arxd of the corresponding area due to the difference in number of light emitting diodes which are turned on between the scan lines.

In particular, with respect to a partial area Arxe in the upper area Arxc, only 6 light emitting diodes may be turned on in a first scan line SCAN0 and only 32 light emitting diodes may be turned on in a second scan line SCAN1.

As such, due to a difference in number of light emitting diodes of 32−6=26, a brightness difference or a luminance difference is generated, and as a result, the crosstalk occurs.

The present disclosure presents a method for compensating the coupling noise in order to reduce the crosstalk. This will be described with reference to FIG. 12 or below.

Figure 10A:
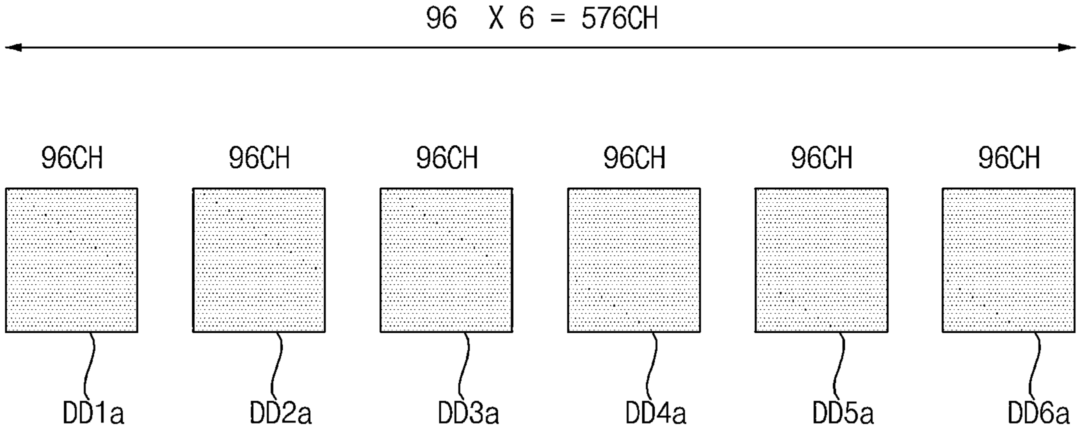

FIG. 10A illustrates an example of disposition of a plurality of data driving integrated circuits.

Referring to the drawing, a plurality of data driving integrated circuits DD1*a* to DD6*a* may similarly output the data signal to 96-channel (CH) light emitting diodes, respectively.

Therefore, the crosstalk caused due to the difference of the channel which is turned on or the light emitting diode which is turned on in FIGS. 9B and 9C may be reduced.

However, the plurality of data driving integrated circuits DD1*a* to DD6*a* may output the data signal to 120-channel light emitting diodes other than 96-CH light emitting diodes, but the respective data driving integrated circuits should be in charge of the same number of channels for a total of 576 channels, so there is a disadvantage in that the number of data driving integrated circuits may not be reduced.

Figure 10B:
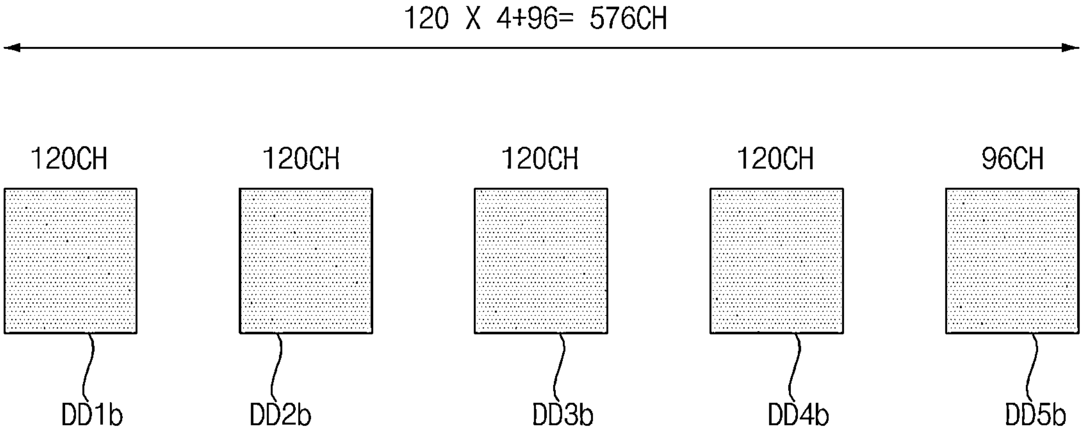

FIG. 10B illustrates another example of disposition of the plurality of data driving integrated circuits.

Referring to the drawing, first to fourth data driving integrated circuits DD1*b* to DD4*b* among the plurality of data driving integrated circuits DD1*b* to DD5*b* may similarly output the data signal to 120-CH light emitting diodes, respectively, and a fifth data driving integrated circuit DD5*b* may output the data signal to 96-CH light emitting diodes.

As a result, unlike FIG. 10A, the number of data driving integrated circuits may be reduced.

Meanwhile, as illustrated in FIG. 10B, the present disclosure presents a method for compensating the coupling noise in order for some of the plurality of data driving integrated circuits DD1*b* to DD5*b* to apply the data signal to different numbers of channels. This will be described with reference to FIG. 12 or below.

Figure 11:
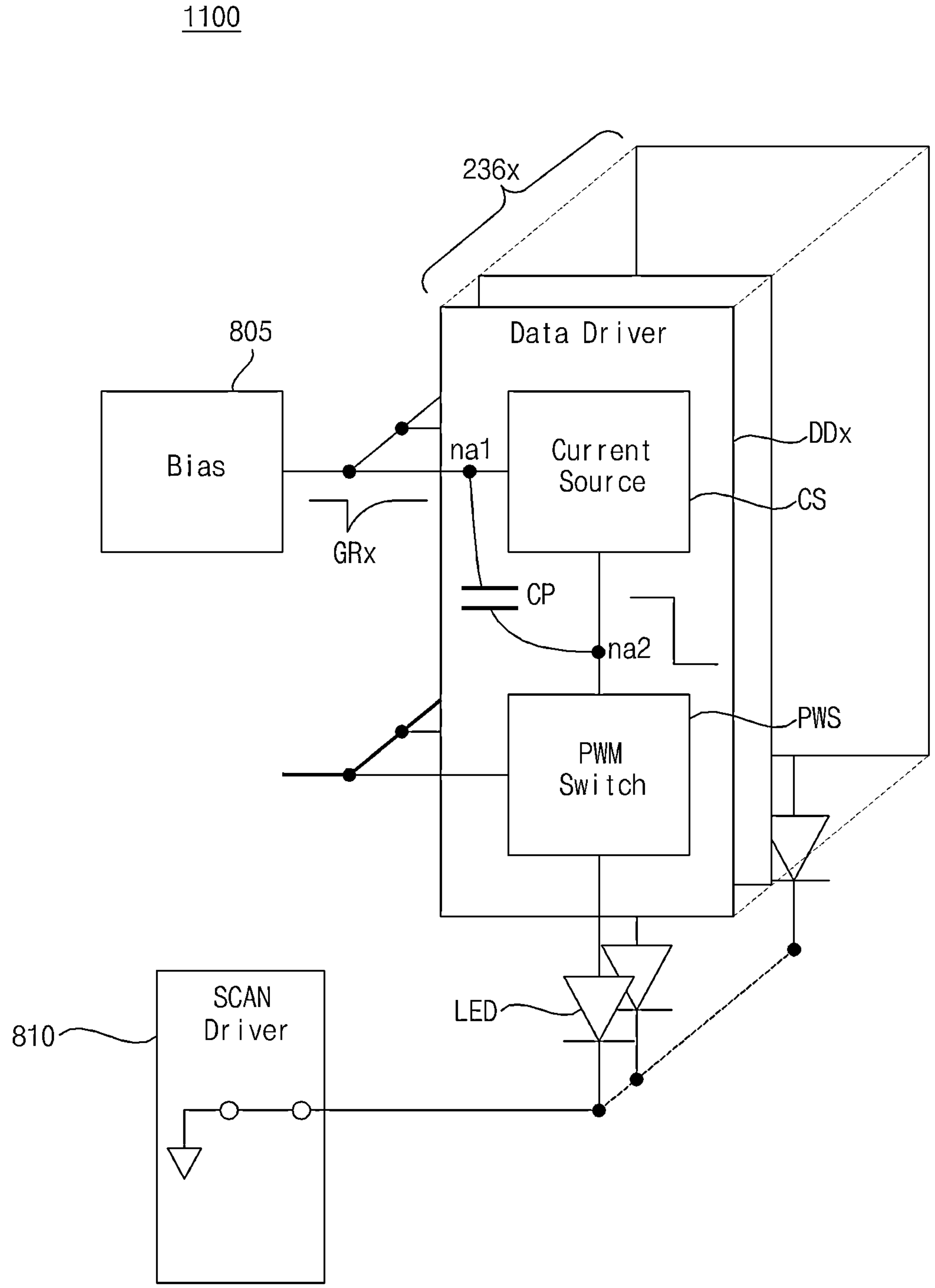
FIG. 11 illustrates an example of an internal circuit diagram of the image display apparatus related to the present disclosure.

FIG. 11 illustrates an example of an internal circuit diagram of the image display apparatus related to the present disclosure.

Referring to the drawing, the image display apparatus 1100 related to the present disclosure may include a scan driver 810 outputting a scan signal to a plurality of light emitting diodes, a bias circuit 805 outputting bias voltage to the plurality of light emitting diodes, and a data driver 236*x* outputting a data signal to the plurality of light emitting diodes.

The data driver 236*x* includes a data driving integrated circuit DDx for outputting the data signal to each channel or each light emitting diode.

The data driving integrated circuit DDx may include a current source CS outputting current corresponding to the data signal, and a switch PWS switching the current from the current source to flow on the light emitting diode LED.

Meanwhile, the bias voltage may be input into a first node na1 which is one end of the current source.

Meanwhile, a parasitic capacitor CP may be disposed between the node na1 which is one end of the current source and a node na2 which is the other end of the current source.

Meanwhile, when a signal input into the switch PWS is switched from a low level to a high level, the switch PWS is turned on, and as a result, a voltage of the node na2 is lowered from the high level to the low level, and as a result, the bias voltage applied to the node na1 is instantaneously lowered.

Meanwhile, when the signal input into the switch PWS is switched from the high level to the low level, the switch PWS is turned off, and as a result, the voltage of the node na2 is raised from the low level to the high level, and as a result, the bias voltage applied to the node na1 is instantaneously raised.

That is, at an on or off time point of the switch PWS, the coupling noise is generated, so the bias voltage is instantaneously lowered or instantaneously raised.

A phenomenon in which the bias voltage is instantaneously lowered or instantaneously raised as such is referred to as a coupling phenomenon, and the resulting noise may be named as coupling noise.

Consequently, by the turn-on or off of the switch PWS, a bias voltage GRx to which the coupling noise is added is input into the current source CS.

The coupling noise becomes larger as the number of channels or light emitting diodes which are simultaneously turned on increases.

Figure 12:
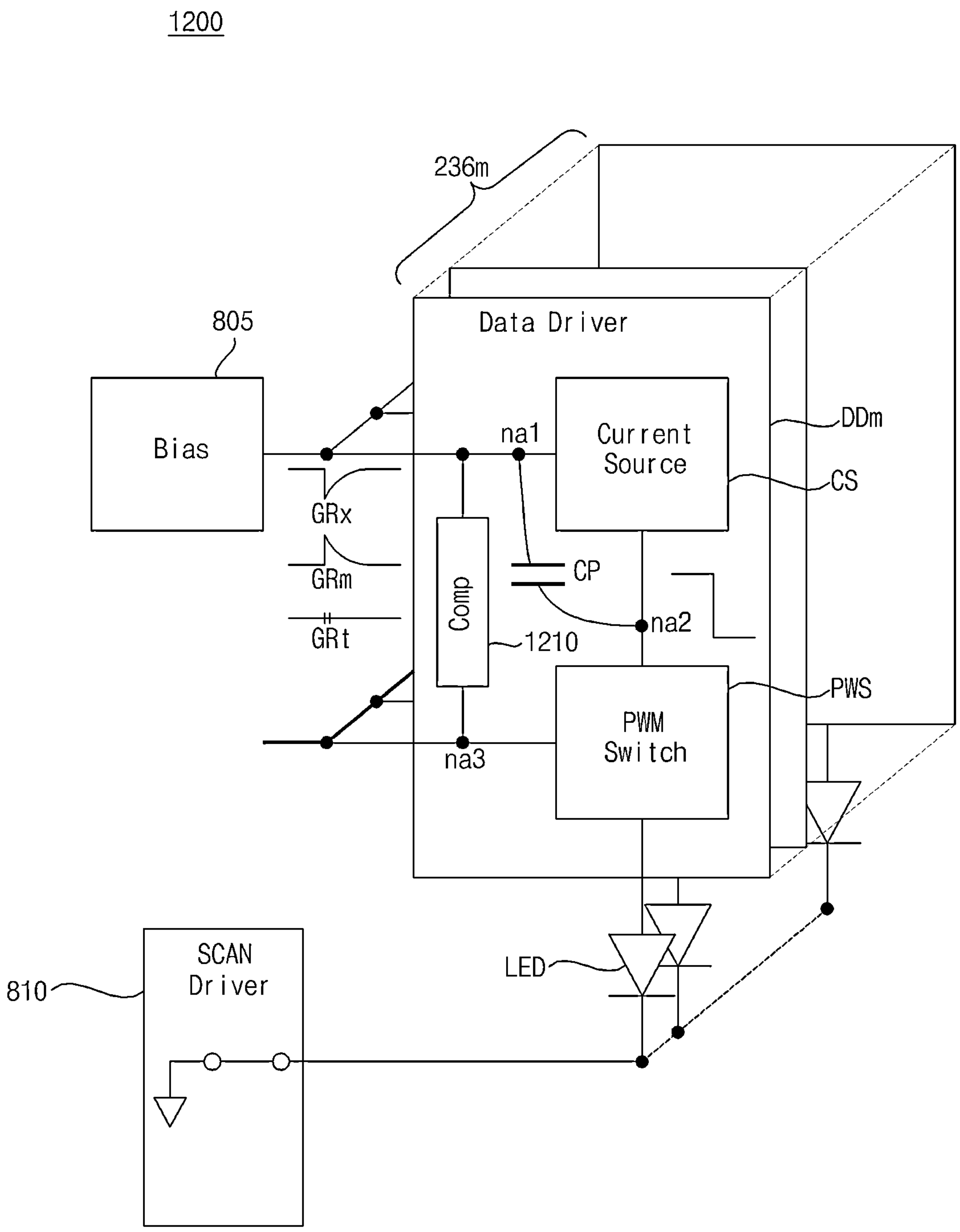
FIG. 12 illustrates an example of an internal circuit diagram of an image display apparatus according to an embodiment of the present disclosure.

FIG. 12 illustrates an example of an internal circuit diagram of an image display apparatus according to an embodiment of the present disclosure. Referring to the drawing, the image display apparatus 1200 according to an embodiment of the present disclosure includes a panel 210 including a plurality of light emitting diodes, a scan driver 810 outputting a scan signal to the plurality of light emitting diodes, a data driver 236*m* outputting a data signal to the plurality of light emitting diodes.

Meanwhile, the image display apparatus 1200 according to an embodiment of the present disclosure further includes a controller 810 controlling the data driver 236*m*.

Meanwhile, the data driver 236*m* may include a plurality of data driving integrated circuits DDm that outputs the data signal to the light emitting diode LED.

Meanwhile, the data driving integrated circuit DDm includes the current source CS, the switch PWS disposed between the current source CS and the light emitting diode LED, and performing switching based on a control signal SEL from the controller 810, and a coupling compensator 1210 outputting a compensation signal GRm for compensating coupling noise GRx generated based on turn-on or turn-off of the switch PWS.

Accordingly, the luminance uniformity between the plurality of light emitting diodes may be maintained. In particular, as illustrated in FIG. 10B, even though there is a difference in number of light emitting diodes LED emitted by the respective data driving integrated circuits DDm, the luminance uniformity between the plurality of light emitting diodes may be maintained.

Meanwhile, the coupling compensator 1210 may be disposed between a first node na1 as one node of the current source CS, into which bias voltage VSG from the bias circuit 805 is input, and a second node na3 as one node of the switch PWS, into which the control signal SEL from the controller 810 is input. Accordingly, the luminance uniformity between the plurality of light emitting diodes may be maintained.

Meanwhile, the coupling compensator 1210 may output the compensation signal GRm which has an inverse phase to the coupling noise GRx upon switching of the switch PWS based on the control signal SEL.

As a result, a predetermined combination signal (GRt)-based bias voltage by combination of the coupling noise GRx and the compensation signal GRm is input into the current source CS. Accordingly, the luminance uniformity between the plurality of light emitting diodes may be maintained.

Meanwhile, the coupling compensator 1210 may output a compensation signal GRm corresponding to a capacitance of the parasitic capacitor CP between the first node na1 which is one end of the current source CS and the second node na2 which is the other end of the current source CS. Accordingly, the luminance uniformity between the plurality of light emitting diodes may be maintained.

Meanwhile, the image display apparatus 1200 according to an embodiment of the present disclosure may further include a bias circuit 805 that outputs the bias voltage VSG to the plurality of data driving integrated circuits DDm. Accordingly, the luminance uniformity between the plurality of light emitting diodes may be maintained.

The image display apparatus 100 according to another embodiment of the present disclosure includes the panel 210 including the plurality of light emitting diodes, and the driving controller 285 outputting the scan signal and the data signal to the plurality of light emitting diodes, and the driving controller 285 includes the plurality of data driving integrated circuits DDm that outputs the data signal to the light emitting diode LED.

In particular, the data driving integrated circuit DDm in the image display apparatus 100 according to another embodiment of the present disclosure includes the current source CS, the switch PWS disposed between the current source CS and the light emitting diode LED, and performing switching, and the coupling compensator 1210 outputting the compensation signal GRm for compensating the coupling noise GRx generated based on the turn-on or turn-off of the switch PWS.

Accordingly, the luminance uniformity between the plurality of light emitting diodes may be maintained. In particular, as illustrated in FIG. 10B, even though there is a difference in number of light emitting diodes LED emitted by the respective data driving integrated circuits DDm, the luminance uniformity between the plurality of light emitting diodes may be maintained.

Figure 13:
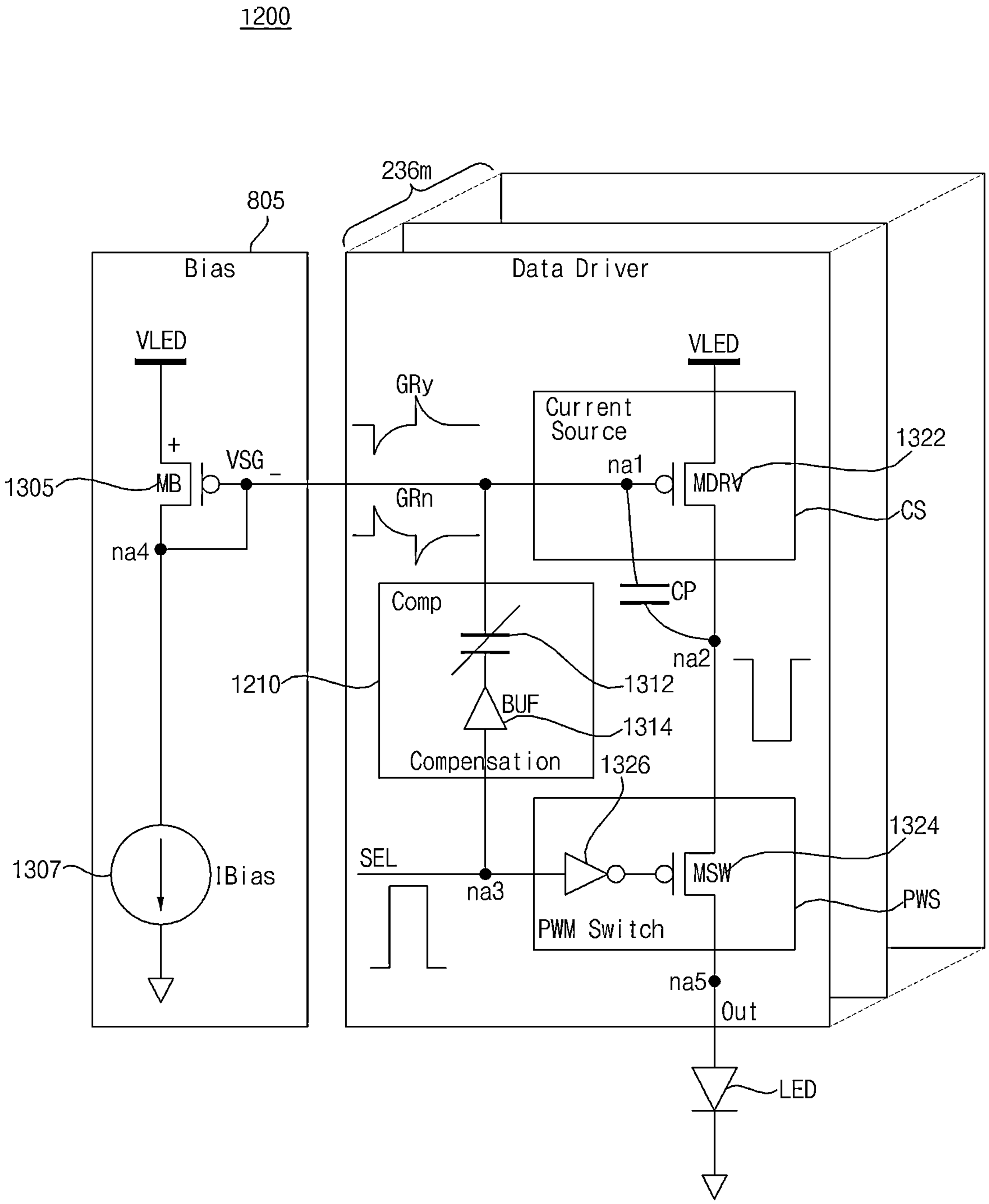
FIGS. 13 to 14C are diagrams referred to in the description of FIG. 12.

FIGS. 13 to 14C are diagrams referred to in the description of FIG. 12.

FIG. 13 illustrates an example of a circuit diagram of the data driving integrated circuit DDm of FIG. 12.

Referring to the drawing, the data driving integrated circuit DDm according to an embodiment of the present disclosure includes the current source CS, the switch PWS disposed between the current source CS and the light emitting diode LED, and performing switching based on the control signal SEL from the controller 810, and a coupling compensator 1210 outputting a compensation signal GRn for compensating coupling noise GRy generated based on the turn-on or turn-off of the switch PWS.

Meanwhile, the coupling compensator 1210 may be disposed between a first node na1 as one node of the current source CS, into which bias voltage VSG from the bias circuit 805 is input, and a second node na3 as one node of the switch PWS, into which the control signal SEL from the controller 810 is input.

Meanwhile, the coupling compensator 1210 may output the compensation signal GRn which has an inverse phase to the coupling noise GRy upon switching of the switch PWS based on the control signal SEL. Accordingly, the luminance uniformity between the plurality of light emitting diodes may be maintained.

Meanwhile, the coupling compensator 1210 may output the compensation signal GRn corresponding to a phase of the control signal SEL. Accordingly, the luminance uniformity between the plurality of light emitting diodes may be maintained.

Meanwhile, when the control signal SEL is switched from the low level to the high level, the coupling noise GRy of the node na2 may be reduced from a first level to a second level.

As a result, when the control signal SEL is switched from the low level to the high level, the coupling compensator 1210 may output a compensation signal GRn increasing from a third level to a fourth level in response to the coupling noise GRy decreasing from the first level to the second level. Accordingly, the luminance uniformity between the plurality of light emitting diodes may be maintained.

Meanwhile, when the control signal SEL is switched from the high level to the low level, the coupling noise GRy of the node na2 may be raised from a fifth level to a sixth level.

In this case, the fifth level may correspond to the second level, and the sixth level may correspond to the first level.

Meanwhile, when the control signal SEL is switched from the high level to the low level, the coupling compensator 1210 may output a compensation signal GRn decreasing from a seventh level to an eighth level in response to the coupling noise GRy increasing from the fifth level to the sixth level. Accordingly, the luminance uniformity between the plurality of light emitting diodes may be maintained.

Meanwhile, the current source CS may output a first current based on the bias voltage VSG from the bias circuit 805, and when the switch PWS is turned on based on the control signal SEL, the switch PWS may output the first current to a connected light emitting diode LED.

Meanwhile, the current source CS may include a first switching element 1322 outputting the first current based on the bias voltage VSG.

Meanwhile, the first switching element 1322 may be PMOS.

Meanwhile, the bias voltage is applied to the first node na which is a gate terminal of the first switching element 1322, and a VLED voltage is applied to a source terminal, and current flows on the node na2 which is a drain terminal.

Meanwhile, the parasitic capacitor CP may be disposed between the node na1 which is the gate terminal and the node na2 which is the drain terminal.

Meanwhile, the coupling compensator 1210 may output a compensation signal GRn corresponding to the capacitance of the parasitic capacitor CP of the first switching element 1322.

Meanwhile, the coupling compensator 1210 may include a buffer 1314 outputting the input control signal SEL and a capacitor 1312 connected to the buffer 1314.

Meanwhile, an input node of the buffer 1314 may be connected to the second node na3, an output node of the buffer 1314 may be connected to one end of the capacitor 1312, and the other end of the capacitor 1312 may be connected to the first node na1.

Meanwhile, the capacitor 1312 in the coupling compensator 1210 may include a variable capacitor 1312.

In particular, the variable capacitor 1312 may have a capacitance corresponding to the capacitance of the parasitic capacitor CP.

As a result, through the coupling compensator 1210, the compensation signal GRn corresponding to the capacitance of the parasitic capacitor CP of the first switching element 1322 may be output.

Meanwhile, the buffer 1314 in the coupling compensator 1210 may include a buffer 1314 outputting a variable-level control signal SEL.

The variable-level control signal SEL output from the buffer 1314 may correspond to the capacitance of the parasitic capacitor CP of the first switching element 1322. As a result, through the coupling compensator 1210, the compensation signal GRn corresponding to the capacitance of the parasitic capacitor CP of the first switching element 1322 may be output.

Meanwhile, the image display apparatus 1200 according to an embodiment of the present disclosure may further include a bias circuit 805 that outputs the bias voltage VSG to the plurality of data driving integrated circuits DDm.

Meanwhile, the bias circuit 805 may output the bias voltage VSG to the current source CS in the data driving integrated circuit DDm, and the bias circuit 805 may include a second switching element 1305 outputting the bias voltage VSG based on switching.

Meanwhile, the second switching element 1305 may be PMOS.

Meanwhile, the VLED voltage may be applied to the source terminal of the second switching element 1305, a current source 1307 may be connected to a node na4 which is the drain terminal, and the gate terminal may be connected to the gate terminal of the first switching element 1311 which is the first node na1.

Meanwhile, the first switching element 1322 and the second switching element 1305 operate as a current mirror, and as a result, current corresponding to the current source 1307 may flow on the first switching element 1322.

Meanwhile, the switch PWS as a pulse width variable based switch may include an inverter 1326 inverting the control signal SEL from the controller 810, and a third switching element 1324 performing switching based on a signal from the inverter 1326.

Meanwhile, the third switching element 1324 may be PMOS.

Meanwhile, the inverter 1326 may be connected to the gate terminal of the third switching element 1324, the drain terminal of the first switching element 1322 which is the node na2 may be connected to the source terminal, and the light emitting node LED may be connected to a node na5 which is the drain terminal.

Accordingly, the luminance uniformity between the plurality of light emitting diodes may be maintained. In particular, as illustrated in FIG. 10B, even though there is a difference in number of light emitting diodes LED emitted by the respective data driving integrated circuits DDm, the luminance uniformity between the plurality of light emitting diodes may be maintained.

Meanwhile, the data driving integrated circuit DDm according to another embodiment of the present disclosure includes the current source CS, the switch PWS disposed between the current source CS and the light emitting diode LED, and performing switching, and the coupling compensator 1210 outputting the compensation signal GRn for compensating the coupling noise GRy generated based on the turn-on or turn-off of the switch PWS.

Accordingly, the luminance uniformity between the plurality of light emitting diodes may be maintained. In particular, as illustrated in FIG. 10B, even though there is a difference in number of light emitting diodes LED emitted by the respective data driving integrated circuits DDm, the luminance uniformity between the plurality of light emitting diodes may be maintained.

Figure 14A:
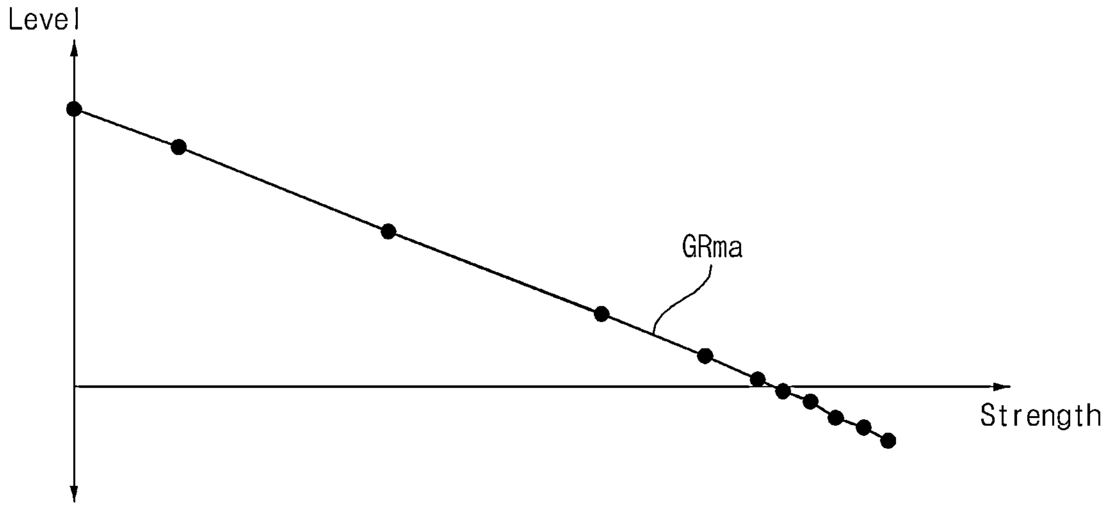

FIG. 14A is a diagram illustrating an example of a change in luminance deviation or crosstalk according to a strength of a compensation signal.

Referring to the drawing, a horizontal axis may correspond to the strength of the compensation signal, and a vertical axis may correspond to the luminance deviation or crosstalk.

As in the drawing, as the strength or level of the compensation signal increases, the luminance deviation or crosstalk between the plurality of light emitting diodes is reduced.

Figure 14B:
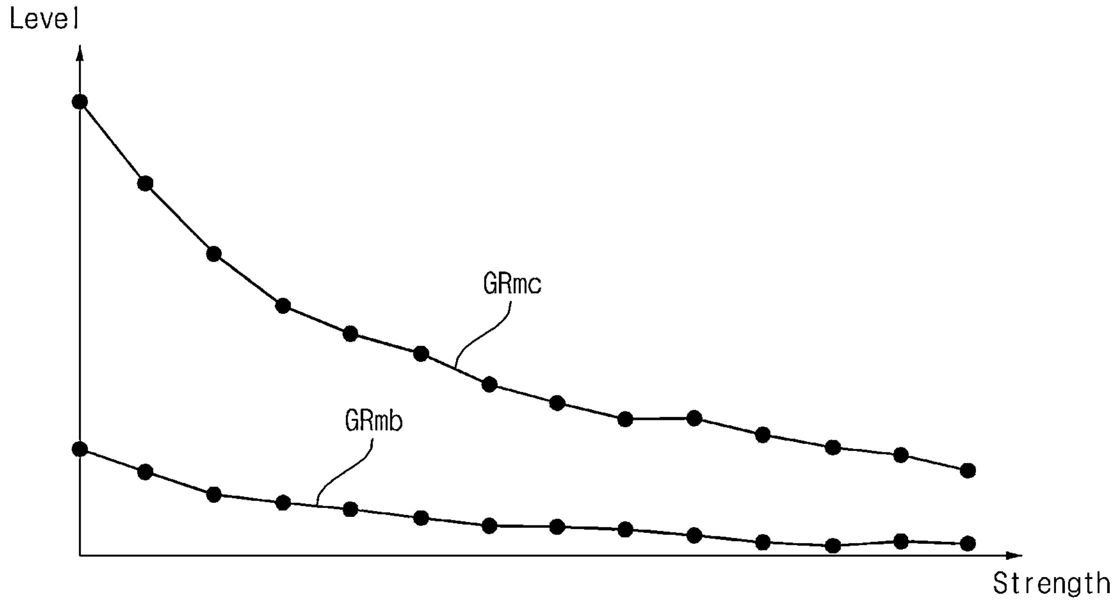

FIG. 14B is a diagram illustrating another example of the change in luminance deviation or crosstalk according to the strength of the compensation signal.

Referring to the drawing, GRmc represents a change in luminance deviation or crosstalk when the coupling compensator 1210 outputting the compensation signal does not operate or is not provided.

Meanwhile, GRmb represents a change in luminance deviation or crosstalk when the coupling compensator 1210 outputting the compensation signal operates, but is provided.

When GRmb and the GRmc are compared, it can be seen that the luminance deviation or crosstalk is significantly reduced based on the output of the compensation signal from the coupling compensator 1210.

Accordingly, the luminance uniformity between the plurality of light emitting diodes may be maintained. In particular, even though there is a difference in number of light emitting diodes LED emitted by the respective data driving integrated circuits DDm, the luminance uniformity between the plurality of light emitting diodes may be maintained.

As described above, an image display apparatus according to an embodiment of the present disclosure includes: a panel including a plurality of light emitting diodes; a scan driver configured to output a scan signal to the plurality of light emitting diodes; a data driver configured to output a data signal to the plurality of light emitting diodes; and a controller configured to control the data driver, and the data driver includes a plurality of data driving integrated circuits configured to output the data signal to the light emitting diode, and the data driving integrated circuit includes a current source, a switch disposed between the current source and the light emitting diode, and to perform switching based on a control signal from the controller, and a coupling compensator configured to output a compensation signal for compensating coupling noise caused based on turn-on or turn-off of the switch. Accordingly, the luminance uniformity between the plurality of light emitting diodes can be maintained. In particular, even though there is a difference in number of light emitting diodes emitted by the respective data driving integrated circuits, the luminance uniformity between the plurality of light emitting diodes can be maintained.

Meanwhile, the coupling compensator may be disposed between a first node as one node of the current source, into which bias voltage from a bias circuit is input, and a second node as one end of the switch, into which the control signal from the controller is input. Accordingly, the luminance uniformity between the plurality of light emitting diodes can be maintained.

Meanwhile, the coupling compensator may output the compensation signal corresponding to an inverse phase to the coupling noise upon switching of the switch based on the control signal. Accordingly, the luminance uniformity between the plurality of light emitting diodes can be maintained.

Meanwhile, the coupling compensator may output the compensation signal corresponding to a phase of the control signal. Accordingly, the luminance uniformity between the plurality of light emitting diodes can be maintained.

Meanwhile, when the control signal is switched from a low level to a high level, the coupling compensator may output the compensation signal increasing from the third level to the fourth level in response to the coupling noise decreasing from a first level to a second level. Accordingly, the luminance uniformity between the plurality of light emitting diodes can be maintained.

Meanwhile, when the control signal is switched from the high level to the low level, the coupling compensator may output the compensation signal decreasing from a seventh level to an eighth level in response to the coupling noise increasing from a fifth level to a sixth level. Accordingly, the luminance uniformity between the plurality of light emitting diodes can be maintained.

Meanwhile, the current source may outputs first current based on the bias voltage from the bias circuit, and when the switch is turned on based on the control signal, the current source may output the first current to the connected light emitting diode. Accordingly, the luminance uniformity between the plurality of light emitting diodes can be maintained.

Meanwhile, the current source may include a first switching element configured to output the first current based on the bias voltage. Accordingly, the luminance uniformity between the plurality of light emitting diodes can be maintained.

Meanwhile, the coupling compensator may output the compensation signal corresponding to a capacitance of a parasitic capacitor of the first switching element. Accordingly, the luminance uniformity between the plurality of light emitting diodes can be maintained.

Meanwhile, the coupling compensator may include a buffer configured to output the input control signal, and a capacitor connected to the buffer. Accordingly, the luminance uniformity between the plurality of light emitting diodes can be maintained.

Meanwhile, an input node of the buffer may be connected to the second node, an output node of the buffer may be connected to one end of the capacitor, and the other end of the capacitor may be connected to the first node. Accordingly, the luminance uniformity between the plurality of light emitting diodes can be maintained.

Meanwhile, the capacitor in the coupling compensator may include a variable capacitor. Accordingly, the luminance uniformity between the plurality of light emitting diodes can be maintained.

Meanwhile, the buffer in the coupling compensator may include a buffer configured to output a variable-level control signal. Accordingly, the luminance uniformity between the plurality of light emitting diodes can be maintained.

Meanwhile, the image display apparatus according to an embodiment of the present disclosure may further include a bias circuit configured to output the bias voltage to the plurality of data driving integrated circuits. Accordingly, the luminance uniformity between the plurality of light emitting diodes can be maintained.

Meanwhile, the bias circuit may output the bias voltage to the current source in the data driving integrated circuit, and the bias circuit may include a second switching element configured to output the bias voltage based on switching. Accordingly, the luminance uniformity between the plurality of light emitting diodes can be maintained.

According to another embodiment of present disclosure, an image display apparatus includes: a panel including a plurality of light emitting diodes; and a driving controller configured to output a scan signal and a data signal to the plurality of light emitting diodes, and the driving controller includes a plurality of data driving integrated circuits configured to output the data signal to the light emitting diode, and the data driving integrated circuit includes a current source, a switch disposed between the current source and the light emitting diode, and to perform switching, and a coupling compensator configured to output a compensation signal for compensating coupling noise caused based on turn-on or turn-off of the switch. Accordingly, the luminance uniformity between the plurality of light emitting diodes can be maintained. In particular, even though there is a difference in number of light emitting diodes emitted by the respective data driving integrated circuits, the luminance uniformity between the plurality of light emitting diodes can be maintained.

Meanwhile, the driving controller may further include a controller configured to output a control signal to the switch, and a bias circuit configured to output bias voltage to the plurality of data driving integrated circuits. Accordingly, the luminance uniformity between the plurality of light emitting diodes can be maintained.

Meanwhile, the coupling compensator may output the compensation signal corresponding to an inverse phase to the coupling noise upon switching of the switch based on the control signal. Accordingly, the luminance uniformity between the plurality of light emitting diodes can be maintained.

According to an embodiment of the present disclosure, a video wall includes a plurality of image display apparatuses, and the image display apparatus includes: a panel including a plurality of light emitting diodes; a scan driver configured to output a scan signal to the plurality of light emitting diodes; a data driver configured to output a data signal to the plurality of light emitting diodes; and a controller configured to control the data driver, and the data driver includes a plurality of data driving integrated circuits configured to output the data signal to the light emitting diode, and the data driving integrated circuit includes a current source, a switch disposed between the current source and the light emitting diode, and to perform switching based on a control signal from the controller, and a coupling compensator configured to output a compensation signal for compensating coupling noise caused based on turn-on or turn-off of the switch. Accordingly, the luminance uniformity between the plurality of light emitting diodes can be maintained. In particular, even though there is a difference in number of light emitting diodes emitted by the respective data driving integrated circuits, the luminance uniformity between the plurality of light emitting diodes can be maintained.

According to another embodiment of the present disclosure, a video wall including a plurality of image display apparatuses, and the image display apparatus includes: a panel including a plurality of light emitting diodes; and a driving controller configured to output a scan signal and a data signal to the plurality of light emitting diodes, and the driving controller includes a plurality of data driving integrated circuits configured to output the data signal to the light emitting diode, and the data driving integrated circuit includes a current source, a switch disposed between the current source and the light emitting diode, and to perform switching, and a coupling compensator configured to output a compensation signal for compensating coupling noise caused based on turn-on or turn-off of the switch. Accordingly, the luminance uniformity between the plurality of light emitting diodes can be maintained. In particular, even though there is a difference in number of light emitting diodes emitted by the respective data driving integrated circuits, the luminance uniformity between the plurality of light emitting diodes can be maintained.

While the embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

What is claimed is:

1. An image display apparatus comprising:

a panel including a plurality of light emitting diodes;

a scan driver configured to output a scan signal to the plurality of light emitting diodes;

a data driver configured to output a data signal to the plurality of light emitting diodes; and a controller configured to control the data driver, wherein the data driver includes a plurality of data driving integrated circuits each configured to output the data signal to a corresponding light emitting diode, and wherein the data driving integrated circuit includes:

a current source, a switch disposed between the current source and the light emitting diode, and configured to perform switching based on a control signal from the controller, and a coupling compensator configured to output a compensation signal for compensating coupling noise caused based on turn-on or turn-off of the switch, wherein the coupling compensator outputs the compensation signal increasing from a third level to a fourth level in response to the coupling noise decreasing from a first level to a second level when the control signal is switched from a low level to a high level, and the coupling compensator outputs the compensation signal decreasing from a seventh level to an eighth level in response to the coupling noise increasing from a fifth level to a sixth level when the control signal is switched from a high level to a low level, wherein the coupling compensator is disposed between a first node as one node of the current source, into which bias voltage from a bias circuit is input, and a second node as one end of the switch, into which the control signal from the controller is input, wherein the coupling compensator includes a buffer configured to output the control signal and a capacitor connected to the buffer, and wherein an input node of the buffer is connected to the second node, an output node of the buffer is connected to one end of the capacitor, and the other end of the capacitor is connected to the first node.

2. The image display apparatus of claim 1 wherein the coupling compensator outputs the compensation signal corresponding to a capacitance of a parasitic capacitor between the first node which is one end of the current source and the second node which is the other end of the current source CS.

3. The image display apparatus of claim 1, wherein the current source outputs first current based on the bias voltage from the bias circuit, and wherein when the switch is turned on based on the control signal, the current source outputs the first current to the light emitting diode.

4. The image display apparatus of claim 3, wherein the current source includes a first switching element configured to output the first current based on the bias voltage.

5. The image display apparatus of claim 4, wherein the coupling compensator outputs the compensation signal corresponding to a capacitance of a parasitic capacitor of the first switching element.

6. The image display apparatus of claim 1, wherein the capacitor in the coupling compensator includes a variable capacitor.

7. The image display apparatus of claim 1, wherein the buffer in the coupling compensator includes a buffer configured to output a variable-level control signal.

8. The image display apparatus of claim 1, further comprising:

a bias circuit configured to output the bias voltage to the plurality of data driving integrated circuits.

9. The image display apparatus of claim 8, wherein the bias circuit outputs the bias voltage to the current source in the data driving integrated circuit, and wherein the bias circuit includes a second switching element configured to output the bias voltage based on switching.

10. An image display apparatus comprising:

a panel including a plurality of light emitting diodes; and a driving controller configured to output a scan signal and a data signal to the plurality of light emitting diodes, wherein the driving controller includes a plurality of data driving integrated circuits configured to output the data signal to the light emitting diode, and wherein the data driving integrated circuit includes:

a current source, a switch disposed between the current source and the light emitting diode, and to perform switching, and a coupling compensator configured to output a compensation signal for compensating coupling noise caused based on turn-on or turn-off of the switch, wherein the coupling compensator outputs the compensation signal increasing from a third level to a fourth level in response to a coupling noise decreasing from a first level to a second level when a control signal is switched from a low level to a high level, and the coupling compensator outputs the compensation signal decreasing from a seventh level to an eighth level in response to the coupling noise increasing from a fifth level to a sixth level when the control signal is switched from a high level to a low level, wherein the coupling compensator is disposed between a first node as one node of the current source, into which bias voltage from a bias circuit is input, and a second node as one end of the switch, into which the control signal from the controller is input, wherein the coupling compensator includes a buffer configured to output the control signal and a capacitor connected to the buffer, and wherein an input node of the buffer is connected to the second node, an output node of the buffer is connected to one end of the capacitor, and the other end of the capacitor is connected to the first node.

11. The image display apparatus of claim 10, wherein the driving controller further includes:

a controller configured to output a control signal to the switch, and a bias circuit configured to output bias voltage to the plurality of data driving integrated circuits.

12. A video wall comprising:

a plurality of image display apparatuses, wherein the image display apparatus comprises:

a panel including a plurality of light emitting diodes;

a scan driver configured to output a scan signal to the plurality of light emitting diodes;

a data driver configured to output a data signal to the plurality of light emitting diodes; and a controller configured to control the data driver, wherein the data driver includes a plurality of data driving integrated circuits configured to output the data signal to the light emitting diode, and wherein the data driving integrated circuit includes:

a current source, a switch disposed between the current source and the light emitting diode, and to perform switching based on a control signal from the controller, and a coupling compensator configured to output a compensation signal for compensating coupling noise caused based on turn-on or turn-off of the switch, wherein the coupling compensator outputs the compensation signal increasing from a third level to a fourth level in response to the coupling noise decreasing from a first level to a second level when the control signal is switched from a low level to a high level, and the coupling compensator outputs the compensation signal decreasing from a seventh level to an eighth level in response to the coupling noise increasing from a fifth level to a sixth level when the control signal is switched from a high level to a low level, wherein the coupling compensator is disposed between a first node as one node of the current source, into which bias voltage from a bias circuit is input, and a second node as one end of the switch, into which the control signal from the controller is input, wherein the coupling compensator includes a buffer configured to output the control signal and a capacitor connected to the buffer, and wherein an input node of the buffer is connected to the second node, an output node of the buffer is connected to one end of the capacitor, and the other end of the capacitor is connected to the first node.

* * * * *